United States Patent
Donovan

(10) Patent No.: US 11,927,694 B2
(45) Date of Patent: Mar. 12, 2024

(54) EYE-SAFE SCANNING LIDAR SYSTEM

(71) Applicant: OPSYS Tech Ltd., Holon (IL)

(72) Inventor: Mark J. Donovan, Mountain View, CA (US)

(73) Assignee: OPSYS Tech Ltd., Holon (IL)

( * ) Notice: Subject to any disclaimer, the term of this patent is extended or adjusted under 35 U.S.C. 154(b) by 120 days.

(21) Appl. No.: 17/227,295

(22) Filed: Apr. 10, 2021

(65) Prior Publication Data

US 2021/0231779 A1    Jul. 29, 2021

Related U.S. Application Data

(63) Continuation of application No. 15/915,840, filed on Mar. 8, 2018, now Pat. No. 11,016,178.

(60) Provisional application No. 62/470,827, filed on Mar. 13, 2017.

(51) Int. Cl.
| | |
|---|---|
| *G01S 7/481* | (2006.01) |
| *G01S 7/484* | (2006.01) |
| *G01S 7/497* | (2006.01) |
| *G01S 17/931* | (2020.01) |

(52) U.S. Cl.
CPC ............ *G01S 7/4815* (2013.01); *G01S 7/484* (2013.01); *G01S 7/497* (2013.01); *G01S 17/931* (2020.01)

(58) Field of Classification Search
None
See application file for complete search history.

(56) References Cited

U.S. PATENT DOCUMENTS

| | | |
|---|---|---|
| 5,157,257 A | 10/1992 | Geiger |
| 5,552,893 A | 9/1996 | Akasu |
| 5,909,296 A | 6/1999 | Tsacoyeanes |
| 6,057,909 A | 5/2000 | Yahav et al. |
| 6,061,001 A | 5/2000 | Sugimoto |
| 6,244,712 B1 | 6/2001 | Smith et al. |

(Continued)

FOREIGN PATENT DOCUMENTS

| | | |
|---|---|---|
| CN | 1512946 A | 7/2004 |
| CN | 101013030 A | 8/2007 |

(Continued)

OTHER PUBLICATIONS

Final Office Action received for JP Patent Application No. 2019-549550, dated Aug. 27, 2021, 7 pages (5 pages of English Translation and 2 pages of Official Copy).

(Continued)

*Primary Examiner* — Luke D Ratcliffe
(74) *Attorney, Agent, or Firm* — Rauschenbach Patent Law Group, PLLC; Kurt Rauschenbach

(57) ABSTRACT

A LIDAR illuminator includes a plurality of laser sources, each comprising an electrical input that receives a modulation drive signal that causes each of the plurality of laser sources to generate an optical beam. A controller having a plurality of electrical outputs, where a respective one of the plurality of electrical outputs is connected to an electrical input of a respective one of the plurality of laser sources, generates a plurality of modulation drive signals that cause the plurality of laser sources to generate a plurality of optical beams that form a combined optical beam. A peak optical energy of the combined optical beam in a measurement aperture at a measurement distance is less than a desired value.

41 Claims, 8 Drawing Sheets

(56) References Cited

U.S. PATENT DOCUMENTS

| | | |
|---|---|---|
| 6,246,708 B1 | 6/2001 | Thornton et al. |
| 6,353,502 B1 | 3/2002 | Marchant et al. |
| 6,680,788 B1 | 1/2004 | Roberson et al. |
| 6,717,972 B2 | 4/2004 | Steinle et al. |
| 6,775,480 B1 | 8/2004 | Goodwill |
| 6,788,715 B1 | 9/2004 | Leeuwen et al. |
| 6,829,439 B1 | 12/2004 | Sidorovich et al. |
| 6,860,350 B2 | 3/2005 | Beuhler et al. |
| 6,888,871 B1 | 5/2005 | Zhang et al. |
| 7,065,112 B2 | 6/2006 | Ghosh et al. |
| 7,110,183 B2 | 9/2006 | von Freyhold et al. |
| 7,544,945 B2 | 6/2009 | Tan et al. |
| 7,652,752 B2 | 1/2010 | Fetzer et al. |
| 7,702,191 B1 | 4/2010 | Geron et al. |
| 7,746,450 B2 | 6/2010 | Willner et al. |
| 7,773,204 B1 | 8/2010 | Nelson |
| 7,969,558 B2 | 6/2011 | Hall |
| 8,072,581 B1 | 12/2011 | Breiholz |
| 8,115,909 B2 | 2/2012 | Behringer et al. |
| 8,247,252 B2 | 8/2012 | Gauggel et al. |
| 8,301,027 B2 | 10/2012 | Shaw et al. |
| 8,576,885 B2 | 11/2013 | van Leeuwen et al. |
| 8,675,181 B2 | 3/2014 | Hall |
| 8,675,706 B2 | 3/2014 | Seurin et al. |
| 8,783,893 B1 | 7/2014 | Seurin et al. |
| 8,824,519 B1 | 9/2014 | Seurin et al. |
| 9,038,883 B2 | 5/2015 | Wang et al. |
| 9,048,633 B2 | 6/2015 | Gronenborn et al. |
| 9,268,012 B2 | 2/2016 | Ghosh et al. |
| 9,285,477 B1 | 3/2016 | Smith et al. |
| 9,348,018 B2 | 5/2016 | Eisele et al. |
| 9,360,554 B2 | 6/2016 | Retterath et al. |
| 9,378,640 B2 | 6/2016 | Mimeault et al. |
| 9,392,259 B2 | 7/2016 | Borowski |
| 9,516,244 B2 | 12/2016 | Borowski |
| 9,520,696 B2 | 12/2016 | Wang et al. |
| 9,553,423 B2 | 1/2017 | Chen et al. |
| 9,560,339 B2 | 1/2017 | Borowski |
| 9,574,541 B2 | 2/2017 | Ghosh et al. |
| 9,575,184 B2 | 2/2017 | Gilliland et al. |
| 9,658,322 B2 | 5/2017 | Lewis |
| 9,674,415 B2 | 6/2017 | Wan et al. |
| 9,791,557 B1 | 10/2017 | Wyrwas et al. |
| 9,841,495 B2 | 12/2017 | Campbell et al. |
| 9,857,468 B1 | 1/2018 | Eichenholz et al. |
| 9,933,513 B2 | 4/2018 | Dussan et al. |
| 9,946,089 B2 | 4/2018 | Chen et al. |
| 9,989,406 B2 | 6/2018 | Pacala et al. |
| 9,989,629 B1 | 6/2018 | LaChapelle |
| 9,992,477 B2 | 6/2018 | Pacala et al. |
| 10,007,001 B1 | 6/2018 | LaChapelle et al. |
| 10,063,849 B2 | 8/2018 | Pacala et al. |
| 10,191,156 B2 | 1/2019 | Steinberg et al. |
| 10,295,660 B1 | 5/2019 | McMichael et al. |
| 10,488,492 B2 | 11/2019 | Hamel et al. |
| 10,514,444 B2 | 12/2019 | Donovan |
| 10,761,195 B2 | 9/2020 | Donovan |
| 10,928,486 B2 | 2/2021 | Donovan |
| 11,016,178 B2 | 5/2021 | Donovan |
| 11,061,234 B1 | 7/2021 | Zhu et al. |
| 11,320,538 B2 | 5/2022 | Donovan et al. |
| 2002/0117340 A1 | 8/2002 | Stettner |
| 2002/0195496 A1* | 12/2002 | Tsikos ............ B82Y 15/00 235/462.01 |
| 2003/0043363 A1 | 3/2003 | Jamieson et al. |
| 2003/0147652 A1 | 8/2003 | Green et al. |
| 2004/0120717 A1 | 6/2004 | Clark et al. |
| 2004/0228375 A1 | 11/2004 | Ghosh et al. |
| 2005/0025211 A1 | 2/2005 | Zhang et al. |
| 2005/0180473 A1 | 8/2005 | Brosnan |
| 2005/0232628 A1 | 10/2005 | von Freyhold et al. |
| 2006/0132752 A1 | 6/2006 | Kane |
| 2006/0231771 A1 | 10/2006 | Lee et al. |
| 2006/0244978 A1 | 11/2006 | Yamada et al. |
| 2007/0024849 A1 | 2/2007 | Carrig et al. |
| 2007/0071056 A1 | 3/2007 | Chen |
| 2007/0091960 A1 | 4/2007 | Gauggel et al. |
| 2007/0131842 A1 | 6/2007 | Ernst |
| 2007/0177841 A1 | 8/2007 | Dazinger |
| 2007/0181810 A1 | 8/2007 | Tan et al. |
| 2007/0219720 A1 | 9/2007 | Trepagnier et al. |
| 2008/0074640 A1 | 3/2008 | Walsh et al. |
| 2008/0186470 A1 | 8/2008 | Hipp |
| 2009/0027651 A1 | 1/2009 | Pack et al. |
| 2009/0140047 A1 | 6/2009 | Yu et al. |
| 2009/0161710 A1 | 6/2009 | Hoashi et al. |
| 2009/0273770 A1 | 11/2009 | Bauhahn et al. |
| 2009/0295986 A1 | 12/2009 | Topliss et al. |
| 2010/0046953 A1 | 2/2010 | Shaw et al. |
| 2010/0215066 A1 | 8/2010 | Mordaunt et al. |
| 2010/0271614 A1 | 10/2010 | Alburquerque et al. |
| 2010/0302528 A1 | 12/2010 | Hall |
| 2011/0176567 A1 | 7/2011 | Joseph |
| 2011/0216304 A1 | 9/2011 | Hall |
| 2012/0038903 A1* | 2/2012 | Weimer ............ G01C 3/08 250/208.2 |
| 2013/0163626 A1 | 6/2013 | Seurin et al. |
| 2013/0163627 A1 | 6/2013 | Seurin et al. |
| 2013/0206967 A1 | 8/2013 | Shpunt et al. |
| 2013/0208256 A1 | 8/2013 | Mamidipudi et al. |
| 2013/0208753 A1 | 8/2013 | van Leeuwen et al. |
| 2013/0278151 A1 | 10/2013 | Lear |
| 2014/0043309 A1 | 2/2014 | Go et al. |
| 2014/0049610 A1 | 2/2014 | Hudman et al. |
| 2014/0071427 A1 | 3/2014 | Last |
| 2014/0104051 A1 | 4/2014 | Breed |
| 2014/0111812 A1 | 4/2014 | Baeg et al. |
| 2014/0139467 A1 | 5/2014 | Ghosh et al. |
| 2014/0160341 A1 | 6/2014 | Tickoo et al. |
| 2014/0218898 A1 | 8/2014 | Seurin et al. |
| 2014/0247841 A1 | 9/2014 | Seurin et al. |
| 2014/0267701 A1 | 9/2014 | Aviv et al. |
| 2014/0303829 A1 | 10/2014 | Lombrozo et al. |
| 2014/0312233 A1 | 10/2014 | Mark et al. |
| 2014/0333995 A1 | 11/2014 | Seurin et al. |
| 2014/0350836 A1 | 11/2014 | Stettner et al. |
| 2014/0376092 A1 | 12/2014 | Mor |
| 2015/0055117 A1 | 2/2015 | Pennecot et al. |
| 2015/0069113 A1 | 3/2015 | Wang et al. |
| 2015/0097947 A1 | 4/2015 | Hudman et al. |
| 2015/0103358 A1 | 4/2015 | Flascher |
| 2015/0109603 A1 | 4/2015 | Kim et al. |
| 2015/0123995 A1 | 5/2015 | Zavodny et al. |
| 2015/0131080 A1 | 5/2015 | Retterath et al. |
| 2015/0160341 A1 | 6/2015 | Akatsu et al. |
| 2015/0219764 A1 | 8/2015 | Lipson |
| 2015/0255955 A1 | 9/2015 | Wang et al. |
| 2015/0260830 A1 | 9/2015 | Ghosh et al. |
| 2015/0260843 A1 | 9/2015 | Lewis |
| 2015/0311673 A1 | 10/2015 | Wang et al. |
| 2015/0316368 A1 | 11/2015 | Moench et al. |
| 2015/0340841 A1 | 11/2015 | Joseph |
| 2015/0362585 A1 | 12/2015 | Ghosh et al. |
| 2015/0377696 A1 | 12/2015 | Shpunt et al. |
| 2015/0378023 A1 | 12/2015 | Royo Royo et al. |
| 2016/0003946 A1 | 1/2016 | Gilliland et al. |
| 2016/0006914 A1 | 1/2016 | Neumann |
| 2016/0025842 A1 | 1/2016 | Anderson et al. |
| 2016/0025993 A1 | 1/2016 | Mor et al. |
| 2016/0033642 A1 | 2/2016 | Fluckiger |
| 2016/0072258 A1 | 3/2016 | Seurin et al. |
| 2016/0080077 A1 | 3/2016 | Joseph et al. |
| 2016/0119611 A1 | 4/2016 | Hall et al. |
| 2016/0161600 A1 | 6/2016 | Eldada et al. |
| 2016/0164261 A1 | 6/2016 | Warren |
| 2016/0254638 A1 | 9/2016 | Chen et al. |
| 2016/0259038 A1 | 9/2016 | Retterath et al. |
| 2016/0266242 A1 | 9/2016 | Gilliland et al. |
| 2016/0274223 A1 | 9/2016 | Imai |
| 2016/0282468 A1 | 9/2016 | Gruver et al. |
| 2016/0291156 A1* | 10/2016 | Hjelmstad ............ G01S 17/86 |
| 2016/0306358 A1 | 10/2016 | Kang et al. |
| 2016/0335778 A1* | 11/2016 | Smits ............ H04N 23/56 |
| 2016/0348636 A1 | 12/2016 | Ghosh et al. |

(56) References Cited

U.S. PATENT DOCUMENTS

| | | |
|---|---|---|
| 2017/0003392 A1 | 1/2017 | Bartlett et al. |
| 2017/0026633 A1 | 1/2017 | Riza |
| 2017/0059838 A1 | 3/2017 | Tilleman |
| 2017/0115497 A1 | 4/2017 | Chen et al. |
| 2017/0131387 A1 | 5/2017 | Campbell et al. |
| 2017/0131388 A1 | 5/2017 | Campbell et al. |
| 2017/0139041 A1 | 5/2017 | Drader et al. |
| 2017/0153319 A1 | 6/2017 | Villeneuve et al. |
| 2017/0168162 A1 | 6/2017 | Jungwirth |
| 2017/0176579 A1 | 6/2017 | Niclass et al. |
| 2017/0181810 A1 | 6/2017 | Tennican |
| 2017/0219426 A1 | 8/2017 | Pacala et al. |
| 2017/0256915 A1 | 9/2017 | Ghosh et al. |
| 2017/0269209 A1 | 9/2017 | Hall et al. |
| 2017/0285169 A1 | 10/2017 | Holz |
| 2017/0289524 A1 | 10/2017 | Pacala et al. |
| 2017/0299722 A1 | 10/2017 | Cuiling et al. |
| 2017/0307736 A1 | 10/2017 | Donovan |
| 2017/0307758 A1 | 10/2017 | Pei et al. |
| 2017/0350982 A1 | 12/2017 | Lipson |
| 2017/0353004 A1 | 12/2017 | Chen et al. |
| 2017/0356740 A1 | 12/2017 | Ansari et al. |
| 2018/0045816 A1 | 2/2018 | Jarosinski et al. |
| 2018/0058923 A1 | 3/2018 | Lipson et al. |
| 2018/0059222 A1 | 3/2018 | Pacala et al. |
| 2018/0062345 A1 | 3/2018 | Bills et al. |
| 2018/0068458 A1 | 3/2018 | Wan et al. |
| 2018/0074198 A1 | 3/2018 | Von Novak et al. |
| 2018/0107221 A1 | 4/2018 | Droz et al. |
| 2018/0113200 A1 | 4/2018 | Steinberg et al. |
| 2018/0113208 A1 | 4/2018 | Bergeron et al. |
| 2018/0120441 A1 | 5/2018 | Elooz et al. |
| 2018/0128920 A1 | 5/2018 | Keilaf et al. |
| 2018/0136335 A1 | 5/2018 | Kare et al. |
| 2018/0152691 A1 | 5/2018 | Pacala et al. |
| 2018/0164408 A1 | 6/2018 | Hall et al. |
| 2018/0167602 A1 | 6/2018 | Pacala et al. |
| 2018/0180720 A1 | 6/2018 | Pei et al. |
| 2018/0180721 A1 | 6/2018 | Pei et al. |
| 2018/0180722 A1 | 6/2018 | Pei et al. |
| 2018/0203247 A1 | 7/2018 | Chen et al. |
| 2018/0209841 A1 | 7/2018 | Pacala et al. |
| 2018/0217236 A1 | 8/2018 | Pacala et al. |
| 2018/0259623 A1 | 9/2018 | Donovan |
| 2018/0259624 A1 | 9/2018 | Kiehn et al. |
| 2018/0259645 A1 | 9/2018 | Shu et al. |
| 2018/0269646 A1 | 9/2018 | Welford et al. |
| 2018/0275248 A1 | 9/2018 | Bailey et al. |
| 2018/0299552 A1 | 10/2018 | Shu et al. |
| 2018/0301872 A1 | 10/2018 | Burroughs et al. |
| 2018/0301874 A1 | 10/2018 | Burroughs et al. |
| 2018/0301875 A1 | 10/2018 | Burroughs et al. |
| 2018/0364334 A1 | 12/2018 | Xiang et al. |
| 2018/0364356 A1 | 12/2018 | Eichenholz et al. |
| 2019/0003429 A1 | 1/2019 | Miyashita |
| 2019/0004156 A1 | 1/2019 | Niclass et al. |
| 2019/0011561 A1 | 1/2019 | Pacala et al. |
| 2019/0011567 A1 | 1/2019 | Pacala et al. |
| 2019/0018115 A1 | 1/2019 | Schmitt et al. |
| 2019/0036308 A1 | 1/2019 | Carson et al. |
| 2019/0049662 A1 | 2/2019 | Thomsen et al. |
| 2019/0056497 A1 | 2/2019 | Pacala et al. |
| 2019/0094346 A1 | 3/2019 | Dumoulin et al. |
| 2019/0098233 A1 | 3/2019 | Gassend et al. |
| 2019/0137607 A1 | 5/2019 | Kostamovaara |
| 2019/0146071 A1 | 5/2019 | Donovan |
| 2019/0170855 A1 | 6/2019 | Keller et al. |
| 2019/0178974 A1 | 6/2019 | Droz |
| 2019/0179018 A1 | 6/2019 | Gunnam et al. |
| 2019/0293954 A1 | 9/2019 | Lin et al. |
| 2019/0302246 A1 | 10/2019 | Donovan et al. |
| 2020/0018835 A1 | 1/2020 | Cepton |
| 2020/0041614 A1 | 2/2020 | Donovan et al. |
| 2020/0081101 A1 | 3/2020 | Donovan |
| 2020/0124732 A1 | 4/2020 | Sutherland et al. |
| 2020/0200874 A1 | 6/2020 | Donovan |
| 2020/0209355 A1 | 7/2020 | Pacala et al. |
| 2020/0278426 A1 | 9/2020 | Dummer et al. |
| 2020/0326425 A1 | 10/2020 | Donovan et al. |
| 2020/0379088 A1 | 12/2020 | Donovan et al. |
| 2020/0386868 A1 | 12/2020 | Donovan et al. |
| 2020/0408908 A1 | 12/2020 | Donovan |
| 2021/0033708 A1 | 2/2021 | Fabiny |
| 2021/0041567 A1 | 2/2021 | Milgrome et al. |
| 2021/0157000 A1 | 5/2021 | Imaki |
| 2021/0181311 A1 | 6/2021 | Donovan |
| 2021/0231806 A1 | 7/2021 | Donovan et al. |
| 2021/0234342 A1 | 7/2021 | Donovan |
| 2021/0278540 A1 | 9/2021 | Maayan et al. |
| 2021/0321080 A1 | 10/2021 | Jeong et al. |
| 2022/0146680 A1 | 5/2022 | Donovan et al. |

FOREIGN PATENT DOCUMENTS

| | | |
|---|---|---|
| CN | 101080733 A | 11/2007 |
| CN | 101545582 A | 9/2009 |
| CN | 102771020 A | 11/2012 |
| CN | 103633557 A | 3/2014 |
| CN | 104898125 A | 9/2015 |
| CN | 105705964 A | 6/2016 |
| CN | 106464366 A | 2/2017 |
| CN | 109073757 A | 12/2018 |
| CN | 107728156 A | 11/2019 |
| CN | 110402398 A | 11/2019 |
| CN | 110914702 A | 3/2020 |
| CN | 111356934 A | 6/2020 |
| CN | 111919137 A | 11/2020 |
| CN | 112543875 A | 3/2021 |
| CN | 113692540 A | 11/2021 |
| CN | 113906316 A | 1/2022 |
| CN | 113924506 A | 1/2022 |
| CN | 114096882 A | 2/2022 |
| CN | 114174869 A | 3/2022 |
| DE | 197 17 399 A1 | 6/1999 |
| DE | 10103861 A1 | 8/2001 |
| DE | 102007004609 A1 | 8/2007 |
| DE | 102014216390 A1 | 2/2016 |
| DE | 102019005059 A1 | 2/2020 |
| EP | 1160540 A1 | 12/2001 |
| EP | 1444696 B1 | 3/2005 |
| EP | 1569007 A2 | 8/2005 |
| EP | 2656099 A1 | 12/2011 |
| EP | 2656106 A1 | 12/2011 |
| EP | 2775316 A2 | 9/2014 |
| EP | 3168641 B1 | 4/2016 |
| EP | 3497477 A1 | 8/2016 |
| EP | 2656100 A1 | 10/2016 |
| EP | 3526625 A1 | 11/2016 |
| EP | 3 159 711 A1 | 4/2017 |
| EP | 3446153 A2 | 2/2019 |
| EP | 3596492 A1 | 1/2020 |
| EP | 3658949 A1 | 6/2020 |
| EP | 3710855 A2 | 9/2020 |
| EP | 3775979 A1 | 2/2021 |
| EP | 3830602 A1 | 6/2021 |
| EP | 3953727 A1 | 2/2022 |
| EP | 3977159 A1 | 4/2022 |
| EP | 3980808 A1 | 4/2022 |
| EP | 3990943 A1 | 5/2022 |
| EP | 4004587 A1 | 6/2022 |
| FR | 2816264 A1 | 5/2002 |
| JP | 5-243552 A | 9/1993 |
| JP | 7-253460 | 10/1995 |
| JP | 8-280173 | 10/1996 |
| JP | 10-126007 A | 5/1998 |
| JP | 2000-147604 A | 5/2000 |
| JP | 2002-214361 A | 7/2002 |
| JP | 2003258359 A | 9/2003 |
| JP | 2003-536061 | 12/2003 |
| JP | 2004-078255 A | 3/2004 |
| JP | 2004-94115 | 3/2004 |
| JP | 2004-361315 A | 12/2004 |
| JP | 2005-331273 A | 12/2005 |
| JP | 2006-162386 A | 6/2006 |

(56) References Cited

FOREIGN PATENT DOCUMENTS

| | | |
|---|---|---|
| JP | 2007-214564 | 8/2007 |
| JP | 2008-015434 A | 1/2008 |
| JP | 4108478 B2 | 6/2008 |
| JP | 2008-180719 | 8/2008 |
| JP | 2009-103529 | 5/2009 |
| JP | 2009-170870 | 7/2009 |
| JP | 2009-204691 | 9/2009 |
| JP | 2010-91855 | 4/2010 |
| JP | 2010-256291 A | 11/2010 |
| JP | 2011-003748 A | 1/2011 |
| JP | 2012-504771 A | 2/2012 |
| JP | 5096008 | 12/2012 |
| JP | 2013-050310 A | 3/2013 |
| JP | 2013-113669 A | 6/2013 |
| JP | 2014-059302 | 4/2014 |
| JP | 2014-077658 A | 5/2014 |
| JP | 2016-146417 | 8/2016 |
| JP | 2016-176721 | 10/2016 |
| JP | 2016-188808 A | 11/2016 |
| JP | 2016-540189 A | 12/2016 |
| JP | 2017-053833 A | 3/2017 |
| JP | 2017-134814 A | 8/2017 |
| JP | 2018-025632 | 2/2018 |
| JP | 2019-060652 | 4/2019 |
| JP | 2019-68528 | 4/2019 |
| JP | 2019-509474 A | 4/2019 |
| JP | 2019-516101 A | 6/2019 |
| JP | 2020-510208 A | 4/2020 |
| JP | 2021-503085 A | 2/2021 |
| JP | 2021-507260 | 2/2021 |
| JP | 6839861 B2 | 3/2021 |
| JP | 6865492 B2 | 4/2021 |
| JP | 2021-073462 A | 5/2021 |
| JP | 2021-073473 A | 5/2021 |
| JP | 2021-105613 A | 7/2021 |
| JP | 2021-519926 A | 8/2021 |
| JP | 2021-139918 A | 9/2021 |
| JP | 2021-532368 A | 11/2021 |
| JP | 2022-001885 A | 1/2022 |
| JP | 6995413 B2 | 1/2022 |
| JP | 2022-022361 A | 2/2022 |
| JP | 2022-036224 A | 3/2022 |
| JP | 7037830 B2 | 3/2022 |
| JP | 2022-526998 A | 5/2022 |
| JP | 2022-534500 A | 8/2022 |
| KR | 10-2000-0053620 A | 8/2000 |
| KR | 10-2009-0016499 A | 2/2009 |
| KR | 10-2012-0053045 A | 5/2012 |
| KR | 10-2012-0061033 | 6/2012 |
| KR | 10-2013-0140554 A | 12/2013 |
| KR | 10-2014-0138724 | 12/2014 |
| KR | 10-2015-0045735 A | 4/2015 |
| KR | 10-2016-0101140 A | 8/2016 |
| KR | 10-2018-0049937 A | 5/2018 |
| KR | 10-2018-0064969 A | 6/2018 |
| KR | 10-2018-0128447 A | 12/2018 |
| KR | 10-2019-0076725 A | 7/2019 |
| KR | 10-2019-0117418 A | 10/2019 |
| KR | 10-2019-0120403 A | 10/2019 |
| KR | 10-2020-0011351 A | 2/2020 |
| KR | 10-2020-0075014 A | 6/2020 |
| KR | 10-2020-0096632 A | 8/2020 |
| KR | 10-2020-0128435 A | 11/2020 |
| KR | 10-2021-0021409 A | 2/2021 |
| KR | 102218679 B1 | 2/2021 |
| KR | 10-2021-0029831 A | 3/2021 |
| KR | 10-2021-0065207 A | 6/2021 |
| KR | 10-2021-0137584 A | 11/2021 |
| KR | 10-2021-0137586 A | 11/2021 |
| KR | 102326493 B1 | 11/2021 |
| KR | 102326508 B1 | 11/2021 |
| KR | 10-2022-0003600 A | 1/2022 |
| KR | 10-2022-0017412 A | 2/2022 |
| KR | 102364531 B1 | 2/2022 |
| KR | 10-2022-0024177 A | 3/2022 |
| KR | 10-2022-0025924 A | 3/2022 |
| KR | 10-2022-0038691 A | 3/2022 |
| KR | 10-2398080 B1 | 5/2022 |
| WO | 99-42856 A1 | 8/1999 |
| WO | 2002/065153 A1 | 8/2002 |
| WO | 2006/044758 A2 | 4/2006 |
| WO | 2006/083349 A2 | 8/2006 |
| WO | 2013107709 A1 | 7/2013 |
| WO | 2014/014838 A2 | 1/2014 |
| WO | 2015/040671 A1 | 3/2015 |
| WO | 2015040671 | 3/2015 |
| WO | 2015/059705 A1 | 4/2015 |
| WO | 2017/112416 A1 | 6/2017 |
| WO | 2017/132704 A1 | 8/2017 |
| WO | 2017/184336 A2 | 10/2017 |
| WO | 2018028795 A1 | 2/2018 |
| WO | 2018082762 A1 | 5/2018 |
| WO | 2018/169758 A1 | 9/2018 |
| WO | 2018166609 A1 | 9/2018 |
| WO | 2018166610 A1 | 9/2018 |
| WO | 2018166611 A1 | 9/2018 |
| WO | 2018169758 | 9/2018 |
| WO | 2018/180391 | 10/2018 |
| WO | 2018/181250 | 10/2018 |
| WO | 2018/191495 A1 | 10/2018 |
| WO | 2019/010320 A1 | 1/2019 |
| WO | 2019/022941 A1 | 1/2019 |
| WO | 2019-064062 A1 | 4/2019 |
| WO | 2019115148 A1 | 6/2019 |
| WO | 2019/195054 A1 | 10/2019 |
| WO | 2019/221776 A2 | 11/2019 |
| WO | 2020/028173 A1 | 2/2020 |
| WO | 2020/210176 A1 | 10/2020 |
| WO | 2020/242834 A1 | 12/2020 |
| WO | 2020/251891 A1 | 12/2020 |
| WO | 2020/263735 A1 | 12/2020 |
| WO | 2021/021872 A1 | 2/2021 |
| WO | 2021/150860 A1 | 7/2021 |
| WO | 2021/236201 A2 | 11/2021 |
| WO | 2022/103778 A1 | 5/2022 |

OTHER PUBLICATIONS

"Notice of Grant" for Korean Patent Application No. 10-2019-7029980, 2 pages, dated Aug. 6, 2021, the Korean Intellectual Property Office, South Korea.
"Notification of Transmittal of the International Search Report and the Written Opinion of the International Searching Authority, or the Declaration" for International Patent Application No. PCT/US2020/043979, dated Nov. 10, 2020, 9 pages, ISA/KR, Korean Intellectual Property Office, Daejeon, Republic of Korea.
"Notification of Transmittal of the International Search Report and the Written Opinion of the International Searching Authority, or the Declaration" for International Patent Application No. PCT/US2021/014564, dated May 17, 2021, 10 pages, ISA/KR, Korean Intellectual Property Office, Daejeon, Republic of Korea.
Communication pursuant to Article 94(3) EPC received for EP Patent Application Serial No. 17786325.5 dated Dec. 17, 2021, 5 pages.
Notification of Reason for Refusal received for Korean Patent Application Serial No. 10-2021-7036648 dated Dec. 17, 2021, 8 pages. (Including English Translation).
Decision to Grant a Patent received for Korean Patent Application Serial No. 10-2020-7016928 dated Nov. 16, 2021, 3 pages (Including English Translation).
Final Office Action received for U.S. Appl. No. 16/168,054 dated Jan. 26, 2022, 46 pages.
Notice of Final Rejection received for Korean Patent Application Serial No. 10-2021-7006391 dated Oct. 22, 2021, 5 pages. (Including English Translation).
International Preliminary Report on Patentability received for PCT Application Serial No. PCT/US2020/033630 dated Dec. 9, 2021, 8 pages.
International Preliminary Report on Patentability received for PCT Application Serial No. PCT/US2020/036634 dated Dec. 23, 2021, 6 pages.

(56) References Cited

OTHER PUBLICATIONS

International Search Report and Written Opinion received for PCT Application Serial No. PCT/US2021/058687 dated Mar. 3, 2022, 11 pages.
Notice of Preliminary Rejection received for Korean Patent Application Serial No. 10-2018-7030512 dated Dec. 23, 2021, 6 pages. (Including English Translation).
Decision to Grant a Patent received for Japanese Patent Application Serial No. 2021-14376 dated Mar. 22, 2022, 05 pages. (Including English Translation).
Non-Final Office Action received for U.S. Appl. No. 17/164,773 dated Apr. 21, 2022, 87 pages.
Decision to Grant a Patent received for chinese Patent Application Serial No. 201880047615.6 dated Mar. 23, 2022, 3 pages. (Including English Translation).
Decision to Grant a Patent received for Korean Patent Application Serial No. 10-2018-7030512 dated Mar. 18, 2022, 4 pages (Including English Translation).
Decision to Grant a Patent received for Korean Patent Application Serial No. 10-2021-7036648 dated May 19, 2022, 4 pages (Including English Translation).
Decision to Grant a Patent received for Japanese Patent Application Serial No. 2019-549550 dated Feb. 25, 2022, 5 pages (Including English Translation).
"Office Action" for Japanese Patent Application No. 2021-0020502, dated Apr. 13, 2022, 10 pages, Japanese Patent Office, Japan.
Notice of Allowance received for U.S. Appl. No. 17/227,300 dated Aug. 2, 2022, 39 pages.
International Search Report and Written Opinion received for PCT Application Serial No. PCT/US2021/020749 dated Jan. 3, 2022, 9 pages.
International Preliminary Report on Patentability received for PCT Application Serial No. PCT/US2020/038927 dated Jan. 6, 2022, 9 pages.
Notification of Reason for Refusal received for Korean Application Serial No. 10-2020-7029872 dated Jan. 19, 2022, 30 pages (Including English Translation).
Extended European Search Report received for European Patent Application Serial No. 19843301.3 dated Feb. 18, 2022, 10 pages.
International Preliminary Report on Patentability received for PCT Application Serial No. PCT/US2020/043979 dated Feb. 1, 2022, 05 pages.
Notice of Final Rejection received for Korean Application Serial No. 10-2020-7029872 dated May 24, 2022, 05 pages (Including English Translation).
Decision to Grant a Patent received for Korean Patent Application Serial No. 10-2021-7006391 dated Feb. 9, 2022, 04 pages (Including English Translation).
Restriction Requirement received for U.S. Appl. No. 16/366,729 dated Jun. 3, 2022, 06 pages.
Office Action received for Japanese Patent Application Serial No. 2021-100687, dated Jul. 1, 2022, 09 pages. (6 pages of English Translation and 3 pages of Official Copy).
Restriction Requirement received for U.S. Appl. No. 16/523,459, dated Jun. 16, 2022, 05 pages.
Notice of Allowance received for U.S. Appl. No. 16/841,930, dated Jun. 29, 2022, 10 pages.
Non-Final Office Action received for U.S. Appl. No. 16/878,140, dated Jun. 22, 2022, 24 pages.
Non-Final Office Action received for U.S. Appl. No. 16/907,732, dated Jul. 13, 2022, 20 pages.
International Preliminary Report on Patentability received for PCT Application Serial No. PCT/US2021/014564, dated Aug. 4, 2022, 06 pages.
Notice of Allowance received for U.S. Appl. No. 16/895,588, dated Aug. 3, 2022, 9 pages.
Non-Final Office Action received for U.S. Appl. No. 16/366,729, dated Aug. 26, 2022, 09 pages.
International Search Report and Written Opinion received for PCT Patent Application No. PCT/US2018/057026, dated Dec. 16, 2019, 9 pages.
Office Action received for Japanese Patent Application Serial No. 2021-168642, dated Aug. 25, 2022, 4 pages (2 pages of English Trasnlation and 2 pages of Official Copy).
Office Action received for Japanese Patent Application Serial No. 2020-526502, dated Aug. 24, 2022, 10 pages (5 pages of English Translation and 5 pages of Official Copy).
Notice of Allowance received for U.S. Appl. No. 16/805,733, dated Aug. 22, 2022, 13 pages.
U.S. Appl. No. 17/164,773, filed Feb. 1, 2021, USPTO.
U.S. Appl. No. 17/155,626, filed Jan. 22, 2021, USPTO.
U.S. Appl. No. 17/191,641, filed Mar. 3, 2021, USPTO.
Plant, et al., 256-Channel Bidirectional Optical Interconnect Using VCSELs and Photodiodes on CMOS, IEEE Journal of Lightwave Technology, Aug. 2001, pp. 1093-1103, vol. 19, No. 8.
Knodl, et al., Bipolar Cascade VCSEL with 130% Differential Quantum Efficiency, Annual Report 2000, Optoelectronics Department, University of ULM, pp. 11-14.
R.A. Morgan, et al., Two-Dimensional Matrix Addressed Vertical Cavity Top-Surface Emitting Laser Array Display, IEEE Photonics Technology Letters, Aug. 1994, pp. 913-917, vol. 6, No. 8.
M. Orenstein, et al., Matrix Addressable Vertical Cavity Surface Emitting Laser Array, Electronics Letters, Feb. 28, 1991, pp. 437-438, vol. 27, No. 5.
K.M. Geib, et al., Fabrication and Performance of Two-Dimensional Matrix Addressable Arrays of Integrated Vertical-Cavity Lasers and Resonant Cavity Photodetectors, IEEE Journal of Selected Topics in Quantum Electronics, Jul./Aug. 2002, pp. 943-947, vol. 8, No. 4.
Moench, et al., VCSEL Based Sensors for Distance and Velocity, Vertical Cavity Surface-Emitting Lasers XX, Edited by K. Choquette, J. Guenter, Proc of SPIE, 2016, 11 pages, vol. 9766, 07660A.
"Notice of Preliminary Rejection" for South Korean Patent Application No. 10-2019-7029980, 4 pages, Korean Intellectual Property Office, South Korea.
Non-Final Office Action received for U.S. Appl. No. 15/456,789 dated Sep. 25, 2019, 58 pages.
Notice of Allowance received for U.S. Appl. No. 15/456,789 dated Apr. 29, 2020, 45 pages.
Notification of Transmittal of the International Search Report and the Written Opinion of the International Searching Authority, or the Declaration, for International Application No. PCT/US2017/026109, dated Jun. 19, 2017, 15 pages, International Search Authority/Korean Intellectual Property Office, Daejeon, Republic of Korea.
Notification of Transmittal of the International Search Report and the Written Opinion of the International Searching Authority, or the Declaration for International Patent Application No. PCT/US2018/021553, dated Jun. 20, 2018, 13 pages, International Searching Authority, Korean Intellectual Property Office, Daejeon, Republic of Korea.
Notification Concerning Transmittal of International Preliminary Report on Patentability (Chapter 1 of the Patent Cooperation Treaty) for International Patent Application No. PCT/US2017/026109, dated Nov. 1, 2018, 13 Pages, the International Bureau of WIPO, Geneva, Switzerland.
Notification of Transmittal of the International Search Report and the Written Opinion of the International Searching Authority, or the Declaration for International Patent Application No. PCT/US2018/041021, dated Nov. 5, 2018, 13 Pages, Korean Intellectual Property Office, Daejeon, Republic of Korea.
Notification of Transmittal of the International Search Report and the Written Opinion of the International Searching Authority, or the Declaration for International Patent Application No. PCT/US2019/024343, Jul. 12, 2019, 15 Pages, ISA/KR, Korean Intellectual Property Office, Daejeon, Republic of Korea.
Notification Concerning Transmittal of International Preliminary Report on Patentability (Chapter I of the Patent Cooperation Treaty) for International Patent Application No. PCT/US2018/021553, dated Sep. 26, 2019, 9 Pages, the International Bureau of WIPO, Geneva, Switzerland.
Notification of Transmittal of the International Search Report and the Written Opinion of the International Searching Authority, or the

(56) References Cited

OTHER PUBLICATIONS

Declaration for International Patent Application No. PCT/US2019/043674, dated Nov. 15, 2019, 16 pages, International Searching Authority/KR, Daejeon, Republic of Korea.

"Supplementary European Search Report" for European Patent Application No. 17786325.5, dated Nov. 7, 2019, 17 pages, European Patent Office, Munich, Germany.

Notification of Transmittal of the International Search Report and the Written Opinion of the International Searching Authority, or the Declaration for International Patent Application No. PCT/US2018/057026, dated Dec. 16, 2019, 11 pages, International Searching Authority, Korean Intellectual Property Office, Daejeon, Republic of Korea.

Notification Concerning Transmittal of International Preliminary Report on Patentability (Chapter I of the Patent Cooperation Treaty) for International Application No. PCT/US18/041021, dated Feb. 6, 2020, 10 pages, the International Bureau of WIPO, Geneva, Switzerland.

"Extended European Search Report" for European Patent Application No. 17786325.5, dated Mar. 11, 2020, 22 pages, European Patent Office, Munich, Germany.

Written Opinion of the International Searching Authority for International Patent Application No. PCT/EP2016/077499 dated Feb. 14, 2017, 7 pages, the International Searching Authority (Including English Translation).

Search Report for International Patent Application No. PCT/EP2016/077499, 2 pages, International Searching Authority/ EPO, Rijswijk, the Netherlands (Including English Translation).

"Notice of Allowance" for Japanese Patent Application No. 2018-555665, dated Dec. 2, 2020, 05 pages, Japanese Patent Office, Japan (Including English Translation).

Notification of Reason for Refusal received for JP Patent Application No. 2021-014376, dated Sep. 27, 2021, 16 pages (Including English Translation).

Non-Final Office Action received for U.S. Appl. No. 15/915,840 dated May 7, 2020, 100 pages.

Notice of Allowance received for U.S. Appl. No. 15/915,840 dated Jan. 19, 2021, 40 pages.

Extended Search Report for European Patent Application No. 18767885.9, dated Nov. 18, 2020, 10 pages, European Patent Office, Munich, Germany.

"Japanese Office Action" for Japanese Patent Application No. 2019-549550, dated Mar. 22, 2021, 2 pages, Japanese Patent Office, Japan (Including English Translation).

Notice of Allowance received for U.S. Appl. No. 16/028,774 dated Aug. 21, 2019, 56 pages.

Non-Final Rejection received for U.S. Appl. No. 16/686,163 dated Apr. 16, 2020, 99 pages.

Notice of Allowance received for U.S. Appl. No. 16/686,163 dated Oct. 16, 2020, 30 pages.

"Office Action" for Korean Patent Application No. 10-2020-7005082, May 8, 2020, 9 pages, Korean Intellectual Property Office, South Korea (Including English Translation).

"Notice of Reasons for Rejection" for Japanese Patent Application No. 2020-504014, dated Sep. 2, 2020, 2 pages, Japanese Patent Office, Japan (Including English Translation).

"Notice of Grant" for Korean Patent Application No. 10-2020-7005082,dated Nov. 24, 2020, 3 pages, the Korean Intellectual Property Office, South Korean (Including English Translation).

"First Office Action" for Chinese Patent Application No. 201880047615.6, dated Jan. 18, 2021, 8 pages, China National Intellectual Property Administration, Beijing, China (Including English Translation).

"Notice of Allowance" for Japanese Patent Application No. 2020-504014, dated Feb. 15, 2021, 3 pages, Japanese Patent Office (Including English Translation).

"Extended European Search Report" for European Patent Application No. 18839499.3, dated Mar. 4, 2021, 10 pages, European Patent Office, Munich, Germany.

"Notice of Preliminary Rejection" for South Korean Patent Application No. 10-2021-7004589, dated Mar. 10, 2021, 5 pages, Korean Intellectual Property Office, South Korea (Including English Translation).

"Office Action" for Japanese Patent Application No. 2021-056628, dated Jun. 14, 2021, 2 pages, Japanese Patent Office, Japan (Including English Translation).

"Notice of Grant" for Korean Patent Application No. 10-2021-7004589, 2 pages, dated Aug. 6, 2021, The Korean Intellectual Property Office, South Korea (Including English Translation).

Second Office Action received for Chinese Patent Application Serial No. 201880047615.6 dated Aug. 25, 2021, 14 pages (Including English Translation).

Decision to Grant a Patent received for Japanese Patent Application Serial No. 2021-056628 dated Nov. 2, 2021, 5 pages. (Including English Translation).

Non-Final Office Action received for U.S. Appl. No. 16/168,054 dated Jun. 1, 2021, 102 pages.

"Notification Concerning Transmittal of International Preliminary Report on Patentability (Chapter I of the Patent Cooperation Treaty)" for PCT/US2018/057026, dated May 28, 2020, 7 pages, the International Bureau of WIPO, Geneva, Switzerland.

Extended European Search Report received for European Patent Application No. 18918938.4, dated Jul. 6, 2021, 9 pages, European Patent Office, Munich, Germany.

"Notice of Preliminary Rejection" for Korean Patent Application 10-2020-7016928, dated Jul. 16, 2021, 6 pages, Korean Intellectual Property Office, Daejeon, South Korea (Including English Translation).

Notification Concerning Transmittal of International Preliminary Report on Patentability {Chapter I of the Patent Cooperation Treaty) for International Patent Application No. PCT/US2019/024343, dated Oct. 15, 2020, 9 pages, the International Bureau of WIPO, Geneva, Switzerland.

"Notice of Preliminary Rejection" for Korean Patent Application No. 10-2020-7029872, dated Jul. 19, 2021, 10 pages, Korean Intellectual Property Office (Including English Translation).

Extended European Search Report received for European Patent Application Serial No. 19781037.7 dated Oct. 25, 2021, 9 pages.

"Office Action" South Korean Patent Application No. 10-2021-7006391, dated May 14, 2021, 8 pages, Korean Intellectual Property Office, South Korea (Including English Translation).

International Preliminary Report on Patentability received for PCT Application Serial No. PCT/US2019/043674 dated Feb. 18, 2021, 10 pages.

"Notification of Transmittal of the International Search Report and the Written Opinion of the International Searching Authority, or the Declaration" for International Patent Application No. PCT/US2020/026964, dated Jul. 28, 2020, 10 pages, ISA/KR, Korean Intellectual Property Office, Daejeon, Republic of Korea.

International Preliminary Report on Patentability received for PCT Patent Application No. PCT/US2020/026964, dated Oct. 21, 2021, 7 pages.

Non-Final Office Action received for U.S. Appl. No. 17/227,300 dated Jun. 30, 2021, 82 pages.

"Notification of Transmittal of the International Search Report and the Written Opinion of the International Searching Authority, or the Declaration" for Internatonal Patent Application No. PCT/US2020/033630, dated Sep. 9, 2020, 10 pages, International Searching Authority, Korean Intellectual Property Office, Daejeon, Republic of Korea.

"Notification of Transmittal of the International Search Report and the Written Opinion of the International Searching Authority, or the Declaration" for PCT/US2020/036634, dated Sep. 21, 2020, 9 pages, ISA/KR, Korean Intellectual Property Office, Daejeong, Republic of Korea.

"Notification of Transmittal of the International Search Report and the Written Opinion of the International Searching Authority, or the Declaration" for International Application No. PCT/US2020/038927, 14 pages, ISA/KR, International Searching Authority, Daejeong, Republic of Korean.

(56) References Cited

OTHER PUBLICATIONS

Decision to Grant a Patent received for Korean Patent Application Serial No. 10-2023-7013943, dated Sep. 25, 2023, 3 pages (1 page of English Translation and 2 pages of Official Copy).
Office Action received for Korean Patent Application No. 10-2023-7007292, dated Apr. 17, 2023, 19 pages (10 pages of English Translation and 9 pages of Official Copy).
Decision to Grant a Patent received for Korean Patent Application Serial No. 10-2023-7009114, dated May 16, 2023, 3 pages (1 page of English Translation and 2 pages of Official Copy).
Office Action for Japanese Patent Application No. 2021-572877, dated May 12, 2023, 12 pages (8 pages of English Translation and 4 pages of Official Copy).
Office Action received for Japanese Patent Application No. 2021-559434, dated May 26, 2023, 17 pages (11 pages of English Translation and 6 pages of Official Copy).
Extended European Search Report received for European Patent Application No. 20831915.2, dated Jun. 2, 2023, 9 pages.
International Preliminary Report on Patentability received for PCT Application Serial No. PCT/US2021/058687, dated May 25, 2023, 7 pages.
Notice of Allowance received for Chinese Patent Application Serial No. 201780024892.0, dated May 30, 2023, 2 pages (Official Copy Only).
Notice of Allowance received for U.S. Appl. No. 16/805,733, dated May 8, 2023, 5 pages.
Non-Final Office Action received for U.S. Appl. No. 18/183,748, dated Aug. 21, 2023, 9 pages.
Extended European Search Report received for European Patent Application No. 20822328.9, dated May 4, 2023, 34 pages.
Notice of Allowance received for Japanese Patent Application No. 2021-020502, dated Jun. 30, 2023, 3 pages (Official Copy only).
Decision to Grant received for Korean Patent Application No. 10-2021-7016081, dated Jul. 14, 2023, 3 pages (1 page of English Translation and 2 pages of Official Copy).
Office Action received for Japanese Patent Application No. 2021-168642, dated Mar. 15, 2023, 5 pages (Previously cited Office Action, now resubmitting along with English Translation; 3 pages of English Translation and 2 pages of Official Copy).
Office Action received for Korean Patent Application No. 10-2022-7036873, dated Mar. 29, 2023, 22 pages (12 pages of English Translation and 10 pages of Official Copy).
Notice of Allowance received for Japanese Patent Application Serial No. 2021-100687, dated Aug. 31, 2023, 03 pages of Official Copy.
Office Action received for Japanese Patent Application Serial No. 2023-000154, dated Sep. 1, 2023, 9 pages (6 pages of English Translation and 3 pages of Official Copy).
Notice of Allowance received for Chinese Patent Application Serial No. 201880017776.0, dated Sep. 27, 2023, 4 pages of Official Copy Only.
Non-Final Office Action received for U.S. Appl. No. 18/183,748, dated Jun. 12, 2023, 8 pages.
Non-Final Office Action received for U.S. Appl. No. 16/523,459, dated Sep. 13, 2022, 11 pages.
International Preliminary Report on Patentability received for PCT Application Serial No. PCT/US2021/020749, dated Sep. 15, 2022, 8 pages.
Notice of Allowance received for U.S. Appl. No. 16/805,733, dated Nov. 10, 2022, 5 pages.
Notice of Allowance received for U.S. Appl. No. 16/841,930, dated Oct. 3, 2022, 8 pages.
Non-Final Office Action received for U.S. Appl. No. 16/168,054, dated Oct. 20, 2022, 16 pages.
Notice of Allowance received for U.S. Appl. No. 17/164,773, dated Nov. 2, 2022, 8 pages.
Notice of Allowance received for U.S. Appl. No. 16/805,733, dated Jan. 25, 2023, 5 pages.
Office Action received for Chinese Patent Application Serial No. 201780024892.0, dated Sep. 2, 2022, 28 pages (11 pages of English Translation and 17 pages of Official Copy).
Extended European Search Report received in European Application No. 20787345.6, dated Dec. 5, 2022, 8 pages.
Final Office Action received for U.S. Appl. No. 16/878,140, dated Feb. 1, 2023, 26 pages.
Notice of Allowance received for U.S. Appl. No. 17/164,773, dated Feb. 1, 2023, 8 pages.
Notice of Allowance received for U.S. Appl. No. 16/841,930, dated Jan. 30, 2023, 9 pages.
International Search Report and Written Opinion received for PCT Patent Application No. PCT/US2022/028297, dated Mar. 13, 2023, 11 pages.
Restriction Requirement received for U.S. Appl. No. 16/941,896, dated Jan. 24, 2023, 06 pages.
Partial European Search Report received for European Patent Application No. 22178999.3, dated Oct. 10, 2022, 22 pages.
Decision to Grant received for Korean Patent Application Serial No. 10-2022-7021139, dated Dec. 14, 2022, 3 pages (1 page of English Translation and 2 pages of Official Copy).
Office Action received for Japanese Patent Application No. 2021-020502, dated Jan. 23, 2023, 6 pages (4 pages of English Translation and 2 pages of Official Copy).
Office Action received for Korean Patent Application No. 10-2021-7016081, dated Oct. 25, 2022, 4 pages (2 pages of English Translation and 2 pages of Official Copy).
Office Action received for Japanese Patent Application Serial No. 2021-199077, dated Dec. 23, 2022, 9 pages (6 pages of English Translation and 3 pages of Official Copy).
Office Action received for Korean Patent Application No. 10-2022-7028820, dated Dec. 15, 2022, 12 pages (6 pages of English Translation and 6 pages of Official Copy).
Extended European Search Report received for European Patent Application No. 20815113.4, dated Jan. 31, 2023, 14 pages.
Partial European Search Report received for European Patent Application No. 20822328.9, dated Feb. 6, 2023, 20 pages.
Office Action received for Korean Patent Application No. 10-2022-7004969, dated Jan. 9, 2023, 11 pages (6 pages of English Translation and 5 pages of Official Copy).
Office Action received for Japanese Patent Application Serial No. 2020-552870, dated Nov. 29, 2022, 11 pages (7 pages of English Translation and 4 pages of Official Copy).
Office Action received for Japanese Patent Application Serial No. 2022-002790, dated Dec. 26, 2022, 10 pages (7 pages of English Translation and 3 pages of Official Copy).
Decision to Grant received for Korean Patent Application Serial No. 10-2020-7029872, dated Nov. 28, 2022, 3 pages (1 page of English Translation and 2 pages of Official Copy).
Office Action received for Korean Patent Application No. 10-2022-7015754, dated Dec. 12, 2022, 21 pages (11 pages of English Translation and 10 pages of Official Copy).
Notice of Allowance received for U.S. Appl. No. 16/366,729, dated Mar. 8, 2023, 7 pages.
Extended European Search Report received for European Patent Application No. 22178999.3, dated Mar. 6, 2023, 25 pages.
International Search Report and Written Opinion received for PCT Patent Application No. PCT/US2022/019054, dated Feb. 20, 2023, 13 pages.
Office Action received for Korean Application Serial No. 10-2021-7036300, dated Feb. 9, 2023, 14 pages (7 pages of English Translation and 7 pages of Official Copy).
Decision to Grant received for Korean Patent Application Serial No. 10-2021-7040665, dated Feb. 23, 2023, 3 pages (1 page of English Translation and 2 pages of Official Copy).
Office Action received for Chinese Patent Application Serial No. 201880017776.0, dated Feb. 16, 2023, 22 pages (10 pages of English Translation and 12 pages of Official Copy).
Office Action received for Chinese Patent Application Serial No. 201880074279.4, dated Mar. 1, 2023, 23 pages (9 pages of English Translation and 14 pages of Official Copy).
Notice of Allowance received for U.S. Appl. No. 17/164,773, dated Apr. 5, 2023, 8 pages.
Office Action received for Japanese Patent Application Serial No. 2021-100687, dated Mar. 14, 2023, 05 pages. (3 pages of English Translation and 2 pages of Official Copy).

(56) References Cited

OTHER PUBLICATIONS

Office Action received for Japanese Patent Application No. 2020-526502, dated Mar. 14, 2023, 8 pages (5 pages of English Translation and 3 pages of Official Copy).
Office Action received for Japanese Patent Application No. 2021-168642, dated Mar. 15, 2023, 2 pages.
Office Action received for Japanese Patent Application No. 2022-80688, dated Mar. 17, 2023, 11 pages (7 pages of English Translation and 4 pages of Official Copy).
Non-Final Office Action received for U.S. Appl. No. 17/155,626, dated Apr. 12, 2023, 24 pages.
Notice of Allowance received for U.S. Appl. No. 16/841,930, dated Apr. 17, 2023, 9 pages.
Final Office Action received for U.S. Appl. No. 16/523,459, dated Apr. 14, 2023, 13 pages.

\* cited by examiner

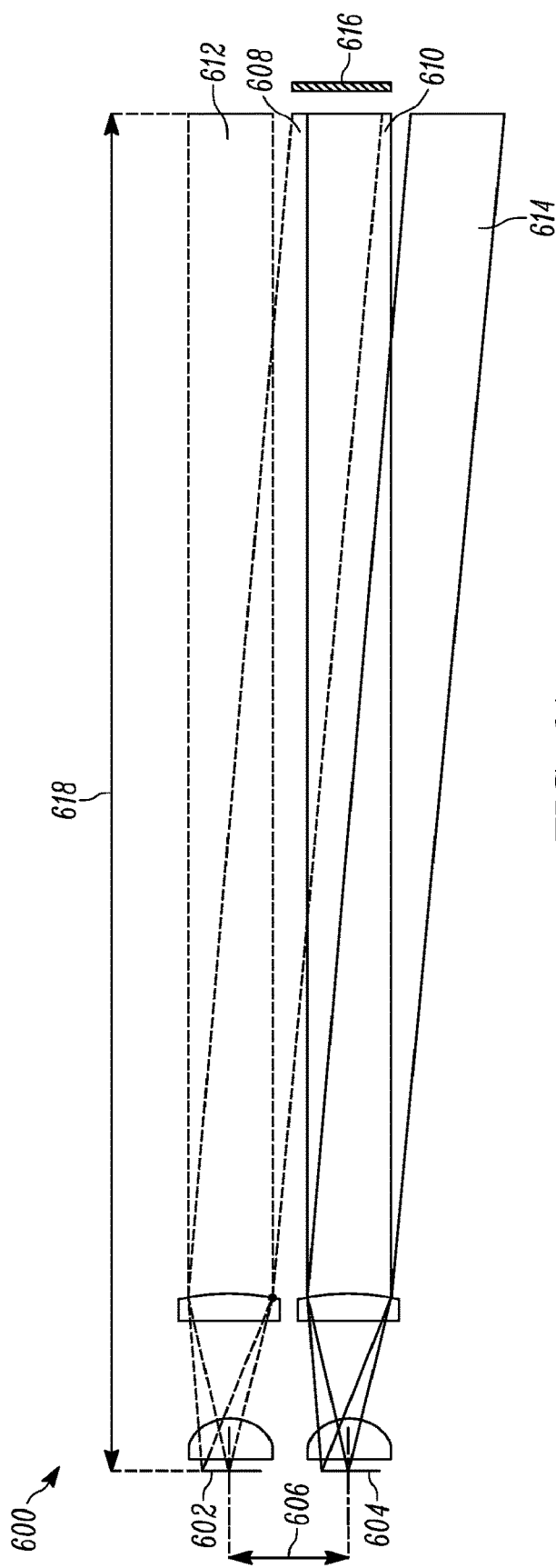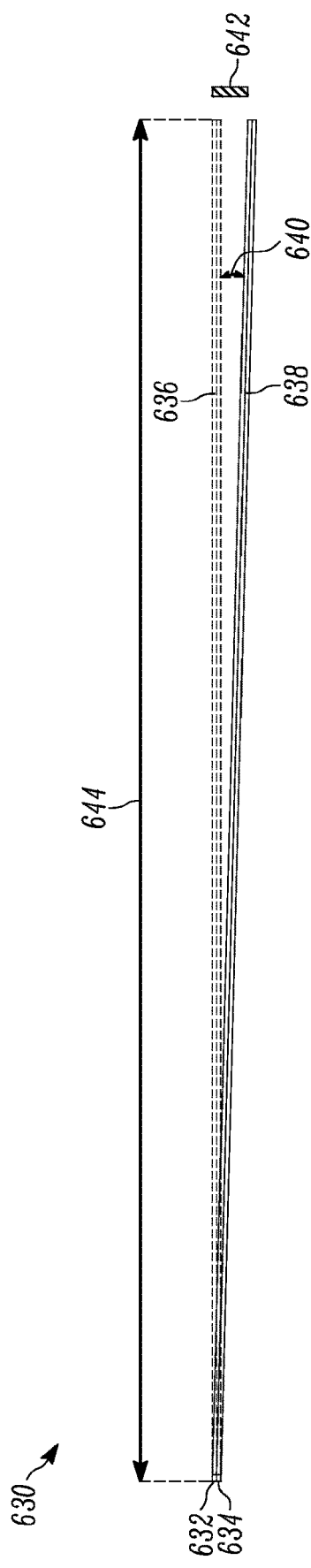

EYE-SAFE SCANNING LIDAR SYSTEM

CROSS REFERENCE TO RELATED APPLICATIONS

The present application is a continuation of U.S. patent application Ser. No. 15/915,840, filed on filed on Mar. 8, 2018, entitled "Eye-Safe Scanning LIDAR System", which claims benefit of U.S. Provisional Patent Application Ser. No. 62/470,827, entitled "Eye-Safe Scanning LIDAR System", filed on Mar. 13, 2017. The entire contents of U.S. patent application Ser. No. 15/915,840, and U.S. Provisional Patent Application Ser. No. 62/470,827 are all herein incorporated by reference.

INTRODUCTION

Light detection and ranging (LIDAR) systems are one of the most critical sensors enabling real-time measurements of object distances. LIDAR systems measure distances to objects by illuminating those objects with a laser light. In some cases, LIDAR systems are used to sense the surroundings on vehicles. In these and other applications, the illuminated objects may be people. As such, there is a chance that the laser light from the LIDAR system will illuminate a person's eye.

Laser light can be very dangerous to a person's eye. The coherence and small beam divergence angle of laser light, combined with the lens of the eye, results in the laser light being focused to an extremely small spot size on the retina. This small spot size, with high enough laser optical power, can result in burning of the retina, and permanent damage to the eye. As such, LIDAR systems that can operate with eye-safe levels of laser light energy are needed.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 6A illustrates a schematic diagram of an embodiment of LIDAR illuminator of the present teaching using two arrays of VCSEL of different wavelengths with a first lens system.

FIG. 6B illustrates a schematic diagram of an embodiment of LIDAR illuminator of the present teaching using two arrays of VCSEL of different wavelengths with a second lens system.

DESCRIPTION OF VARIOUS EMBODIMENTS

Figure 1:
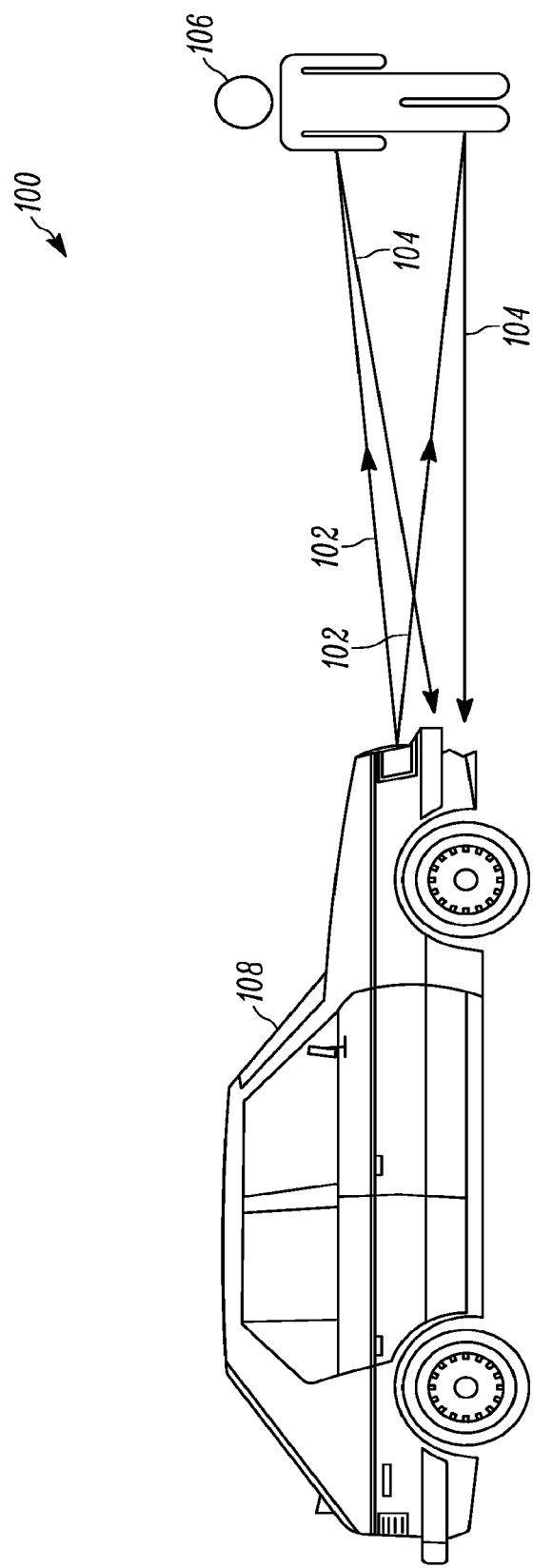
FIG. 1 illustrates a LIDAR system of the present teaching implemented on a vehicle.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The present teaching relates to Light Detection and Ranging Systems (LIDAR) that measure distances to various objects or targets that reflect and/or scatter light. In particular, the present teaching relates to LIDAR systems that are able to provide LIDAR measurements with a high refresh rate, up to 1 KHz, over a long range, in excess of 70 m, and ensuring system operation consistent with a Class 1 eye-safety standard.

Systems of the present teaching may use laser light sources that include single emitters and/or multiple emitters. For example, light sources that use a single element VCSEL or a single edge-emitting laser device would be considered single emitters. Light sources that use multiple VCSEL elements or multiple edge-emitting laser sources arranged on one or more substrates are considered multiple emitter sources. The multi-element emitters may be configured in various array configurations, including one-dimensional and two-dimensional arrays. One skilled in the art will appreciate that the below description of the present teaching refers to various embodiments of eye-safe scanning LIDAR systems with single-emitter sources and/or multi-emitter laser sources. It will be apparent to those familiar with the art that the features of particular embodiments of LIDAR systems of the present teaching should not be considered limited to either single-emitter and/or multi-emitter laser sources, but rather should be more broadly construed to apply to both single-emitter and/or multi-emitter laser sources.

FIG. 1 illustrates the operation of a LIDAR system 100 of the present teaching implemented in a vehicle. The LIDAR system 100 includes a laser projector, which is sometimes referred to as an illuminator, that projects light beams 102 generated by a light source toward a target scene. The LIDAR system 100 also includes a receiver that receives the light 104 that reflects off an object, shown as a person 106, in that target scene. The LIDAR system 100 can also include a controller that computes the distance to the object 106 from the reflected light. In various embodiments, the controller can be a simple electrical circuit or a more complicated processor, depending on the particular LIDAR requirements. In addition, the LIDAR system 100 also include an element that can scan or provide a particular pattern of the light, which may be a static pattern, across a desired range and field-of-view (FOV). The receiver and controller are used to convert the received signal light into measurements that represent a pointwise three-dimensional (3D) map of the surrounding environment that falls within the LIDAR system range and FOV.

The illuminator that includes the laser source and optical beam projector, as well as the receiver, is sometimes located on the front side of a vehicle 108. A person 106, and/or another object, such as a car or light pole, will provide light reflected from the source back to the receiver. A range or distance to that object is determined by the LIDAR receiver from the reflected light. The LIDAR receiver calculates range information based on time-of-flight measurements of light pulses emitted from the light source.

In addition, information about the optical beam profile that illuminates the scene in a target plane associated with a particular range that is known from, for example, the particular design of the source and projector system, is used to determine location information about the reflecting surface in order to generate a complete x,y,z, or three-dimensional picture of the scene. In other words, the pointwise three-dimensional map of the surrounding environment represents a collection of measurement data that indicates position information from all the surfaces that reflect the illumination from the source to the receiver within the field-of-view of the LIDAR system. In this way, a three-dimensional representation of objects in the field-of-view of the LIDAR system is obtained. The pointwise three-dimensional data map may also be referred to as a measurement point cloud.

Various embodiments of LIDAR systems of the present teaching operate with various laser pulse durations and laser pulse repetition rates, depending on the desired performance. One example is the sampling rate required for one embodiment of an automotive LIDAR system. A car moving at 100 kilometers per hour (kph) is traveling at roughly 28 millimeters per millisecond (mm/msec). If two cars are approaching each other, then the relative distance will decrease at twice that rate, or 56 mm/msec. For a system that is accurate across the full field-of-view, with a distance accuracy of 50 mm (~2 inches) for each measurement point, we need to be able to scan the complete FOV during that time. The eye-safe LIDAR systems of the present teaching may be applied to other types of LIDAR sensing applications, and are not restricted to sensing for a vehicle or automobile.

Multi-source and multi-wavelength LIDAR system have been proposed by the assignee of the present application. See, U.S. patent application Ser. No. 15/456,789, filed on Mar. 13, 2017 and entitled Multi-Wavelength LIDAR System. The entire contents of U.S. patent application Ser. No. 15/456,789 are incorporated herein by reference. For purposes of illustration, assume a multi-source LIDAR system using 1,000 laser clusters corresponding to particular desired three-dimensional pointwise measurement locations. In order to achieve positional accuracy across the full FOV, as described above, one would need to scan through all 1,000 lasers every millisecond. For a single-wavelength system, where we can only operate and detect one laser at a time, this means we have only one microsecond per laser to acquire the position information for that measurement point.

One feature of the multi-wavelength LIDAR system of the present teaching is that it provides a relatively high refresh rate. Refresh rate is sometimes referred to as frame rate. The refresh rate relates directly to how frequently the distance measurements of a three-dimensional or two-dimensional scene being sensed by the LIDAR are updated. Some embodiments of the present teaching provide a system refresh rate that is at least the same as current low-cost CMOS camera systems that typically have a refresh rate of 30 Hz. However, the refresh rate can be 1 kHz or higher. To understand why a high refresh rate is important, consider an automobile traveling at 100 km/hour. Under these conditions, the automobile will move about 3 meters in 0.1 seconds. So, if the refresh rate is only 10 Hz, objects in front of the car will move significantly in that time causing a significant loss of resolution.

For example, a LIDAR system of the present teaching that uses four wavelengths with 4,096 lasers that are being measured in one frame, and a pulse duration of one microsecond, the refresh rate would be 1 kHz for a single system. If multiple systems are used to cover the complete 360-degree field-of-view, then the refresh rate would still need to be 1 kHz. This assumes a single pulse per measurement. However, if multiple pulses per measurement are used, the refresh rate will be lower.

Laser eye-safety regulations have been established to set standards for the allowable amount of laser radiation that enters the eye without causing eye damage. The standards ensure that products emitting laser light are labeled in such a fashion that consumers understand the safety risks associated with a particular product. The most commonly referenced standard worldwide is IEC 60825-1, published by the International Electrotechnical Commission (IEC), which has been adopted in Europe as EN 60825-1. In the US, laser products are covered by CDRH 21 CFR 1040.10. Compliance with EN 60825-1 has been established as acceptable to meet the U.S. federal standard.

Laser eye-safety standards have different safety categories that are classified by wavelength and maximum output power. The standards define the maximum permissible exposure (MPE), which is specified as the optical power or energy that can pass through a fully open pupil, without causing any damage. The MPE is a function of energy so it is related to the laser pulse duration and repetition rate in a system where the laser pulsed (i.e. not operated continuously).

A Class 1 laser is safe under all conditions of normal use. The maximum permissible exposure (MPE) cannot be exceeded in a Class 1 product. It is highly desired for an automotive LIDAR system to be Class 1 eye safe. In a Class 1 rated LIDAR system, the laser light produced by the LIDAR system will not exceed the MPE in all cases where exposure to a human eye is possible.

Care must be taken in LIDAR systems to ensure Class 1 eye safety while also providing the highest system performance. System performance may include parameters such as angular resolution, refresh rate, field-of-view and range.

Many of these performance parameters are linked directly to the laser power and/or the intensity of an optical beam produced at a target plane of the LIDAR system. For example, in order to have the best possible signal-to-noise ratio in the receiver, and also to provide a long maximum distance range, it is desired to have the highest peak optical power for the transmitted laser pulses. However, Class 1 eye safety restricts the maximum peak optical power of each pulse.

For example, calculating from the International Electrotechnical Commission (IEC) standard IEC 60825-1 that for an exposure duration between 10 psec and 5 μsec, the allowable exposure energy for a 903-nm laser will be 0.392 μJoules. For a single laser pulse of duration of 5 nsec, transmitted every 5 μsec, assuming a square pulse shape with zero rise and fall times, the maximum peak power of this pulse would be 78.4 W. For a square pulse with a 50-nsec duration transmitted every 5 μsec, the maximum peak power would be ten times less, or 7.84 W.

The exposure energy is the energy calculated to pass through a fully open pupil of the eye. The International Electrotechnical Commission (IEC) standard includes instructions on how this should be measured, and for a system with wavelength of 400 nm to 1,400 nm wavelength, there are two conditions that apply. Condition 1 applies to a beam collimated by a telescope or binoculars so that the hazard is increased where the aperture stop equals 50 mm at 2,000 mm. Condition 3 applies to determining irradiation relevant for the unaided eye, for scanning beams that define an aperture stop/limiting aperture of 7 mm at 100 mm. The reference point for scanned emission is the scanning vertex (pivot point of the scanning beam). A LIDAR system according to the present teaching with a 100 meter range would nominally fire pulses every microsecond to maximize the refresh rate. In this example, the optical peak power is constrained so that a pulse every one microsecond would need to be five times less in magnitude then if a pulse was fired every five microseconds.

Figure 2:
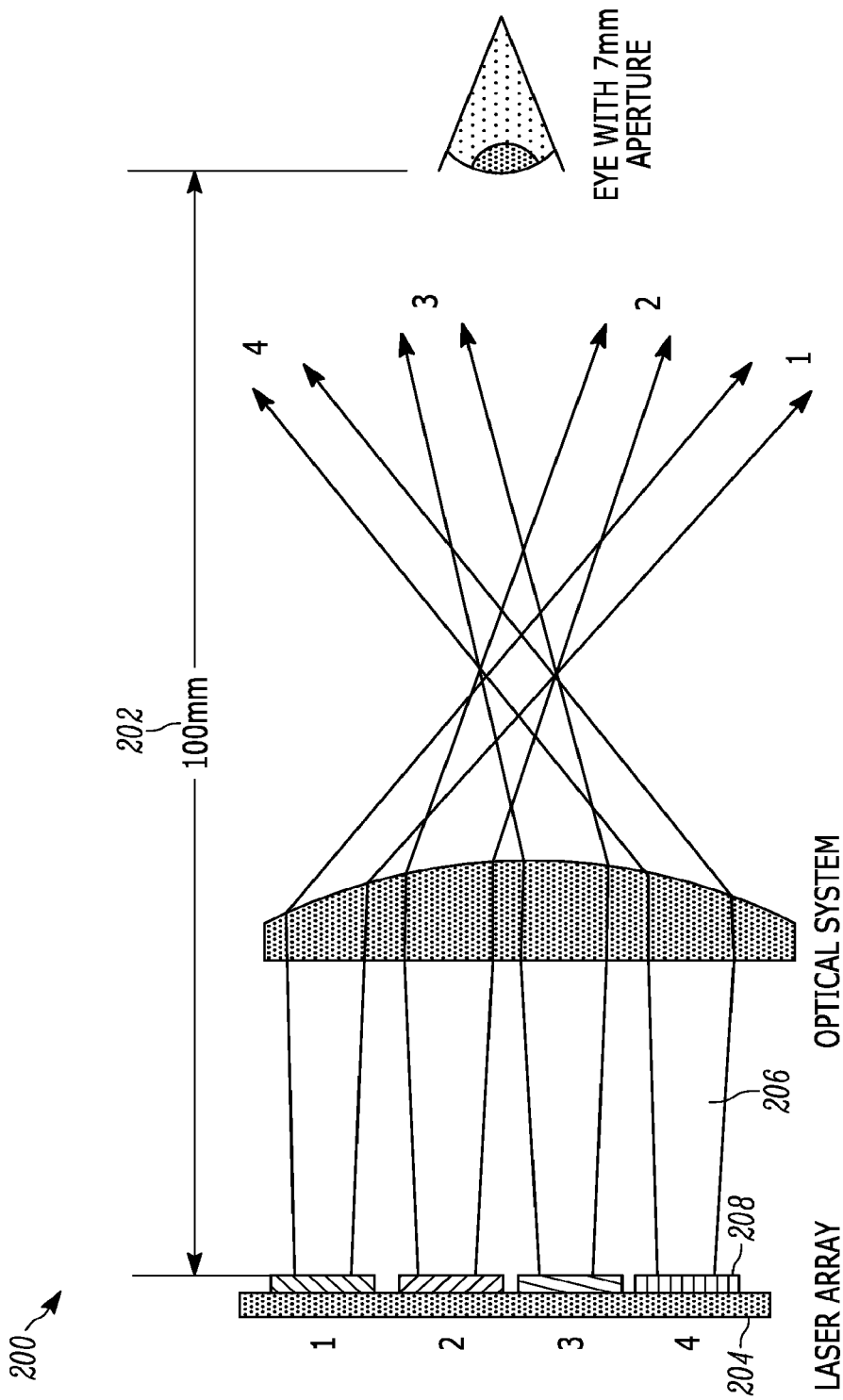
FIG. 2 illustrates a diagram for determining Maximum Permissible Exposure (MPE) limits for a LIDAR system of the present teaching.

One aspect of the present teaching is that LIDAR systems that use a plurality of lasers can be operated such that the lasers are energized in a way that reduces, or substantially eliminates, the overlap in optical power of the plurality of optical beams so as to create an eye safe system. As described herein, MPE provides a maximum energy measured at any fixed 7-mm aperture at a distance of 100 mm from the laser array, as well as at 50 mm at a distance of 2,000 mm. The added power at particular measurement points from the overlap of the plurality of optical beams will affect the maximum powers allowed for each optical beam. However, the performance, e.g. signal-to-noise, for each measurement point will be limited by this maximum power. FIG. 2 illustrates this concept.

FIG. 2 illustrates a diagram for determining MPE limits for a LIDAR system illuminator 200 of the present teaching. It is desirable for some applications to operate with each beam generated by a particular laser at the MPE limit for a Class 1 standard. In these embodiments, if two beams are operating simultaneously and overlap, the energy will exceed the MPE limit in the region of optical beam overlap. In these embodiments, one solution according to the present teaching to the problem of overlapping optical beams is to energize, or fire, the lasers that generate the overlapping optical beams at separate times. In this way, the energy of both beams is not simultaneously provided in an overlapping section of the two optical beams. This allows both beams to operate at the full energy level allowed by the MPE, without the chance that the system would exceed the eye-safe limit in the overlapping beam region.

The LIDAR system illuminator 200 is designed such that at a distance of 100 mm 202 from the laser array 204, the four beams 206 corresponding to discrete lasers 208, are spaced further apart then 7 mm. Said another way, none of the optical beams 206 are closer than 7 mm at the 100 mm distance so they do not overlap at 100 mm. In this optical configuration, all four lasers 206 could be fired simultaneously without any two of the optical beams combining to form a combined beam that has more optical power than any of the individual optical beams in a manner that impacts eye safety. This is true regardless of whether each laser emits an optical beam with a unique wavelength or whether at least two of the optical beams emit optical beams with the same wavelength. Various embodiments of the scanning LIDAR system of the present teaching utilize illuminators comprising lasers or laser arrays operating at a single wavelength and illuminators comprising lasers or laser arrays operating at multiple wavelengths.

In some embodiments of the LIDAR system illuminators of the present teaching that utilize numerous lasers, such as hundreds of lasers, it is likely that the optical beams from some lasers would overlap at the eye safety measurement aperture, and some would not. In such systems, the sequence of firing of the lasers cannot be totally random in order to prevent overlapping beams that could present an eye safety danger. Thus, one aspect of the present teaching uses a pseudorandom sequence of firing of the lasers. The pattern of firing satisfies a set of mathematical rules which results in an allowed sequence of firing that meets the eye safety limit.

Another aspect of the present teaching is to select preferred firing sequences that would maximize the refresh rate of the system while maintaining an eye safe environment. For example, a non-random firing pattern can be determined which would maximize the overall pulse rate, while maintaining an eye-safe environment. Such a firing pattern could be implemented through a set of rules established in, for example, the firmware of the controller that fires the lasers.

In different embodiments of the LIDAR illuminators of the present teaching, each laser source generates an optical beam with a particular energy based on the pulse width, repetition rate, and peak power of the optical pulses. It is understood by those skilled in the art that the optical beam generated by each laser source has a particular energy density as a function of position in a plane located at the measurement distance. The energy density of the light produced from multiple laser sources in the plane located at the measurement distance is the sum of the individual energy densities as a function of position in the plane resulting from the combination of optical beams. An eye-safe classification is met, for example, if the combined energy density of the combined optical beam as a function of position results in a peak energy, sampled in a 7-mm aperture diameter across the plane at a 100-mm measurement distance, which does not exceed the MPE.

By controlling the pattern of electrical signals that fire the plurality of laser sources, it is possible to control the energy density produced in a plane by the combined optical beams of those plurality of lasers. In particular, it is possible to produce a combined optical beam from the plurality of laser sources wherein a peak optical energy of the combined optical beam in a measurement aperture at a particular measurement distance is less than a desired value. In some embodiments, the measurement aperture is the 7-mm aperture defined by the International Electrotechnical Commission, the measurement distance is 100 mm, and the peak optical energy is the MPE as defined by the International Electrotechnical Commission and based on the particular laser wavelength.

Figure 3:
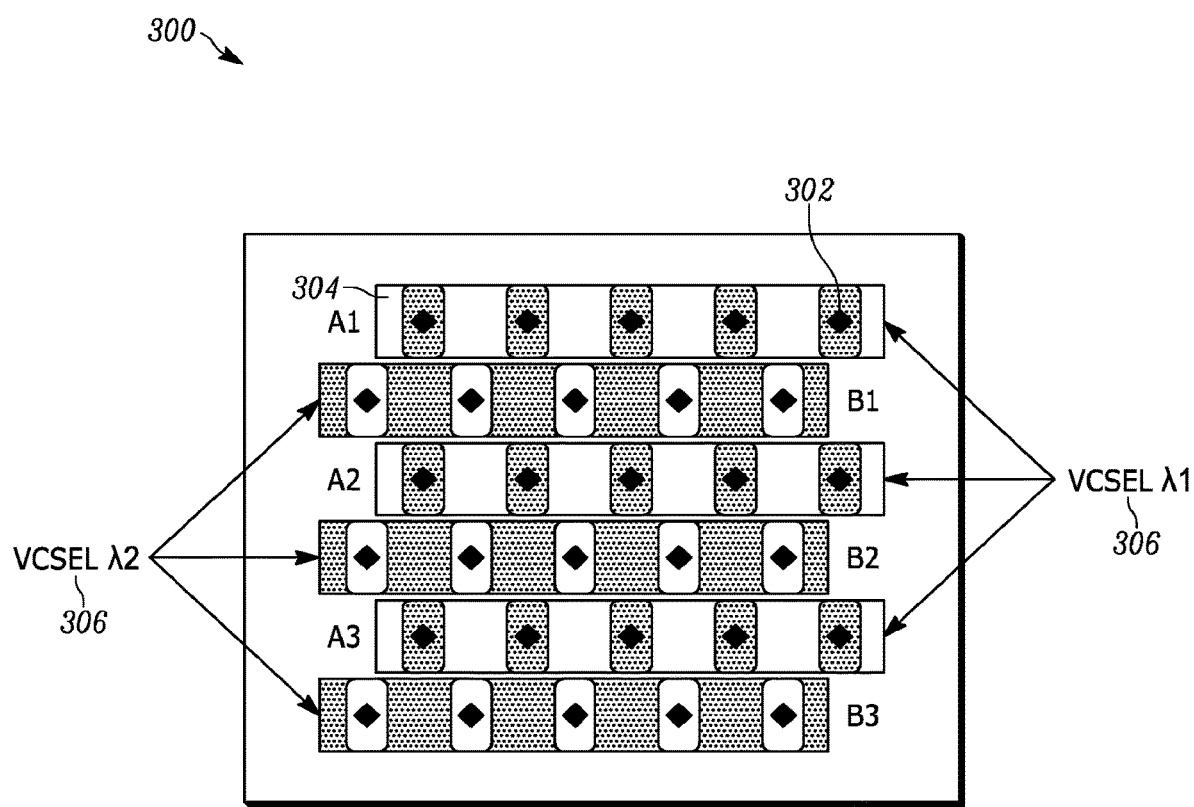
FIG. 3 illustrates an embodiment of a laser array for a LIDAR system illuminator of the present teaching.

FIG. 3 illustrates an embodiment of a laser array 300 for a LIDAR system illuminator of the present teaching. The laser array 300 consists of thirty individual laser emitters 302 in a configuration of three bars 304 each with two different wavelengths 306. In this configuration, the laser emitters 302 that are immediately adjacent to each other would generate optical beams that overlap in a particular eye-safety measurement aperture. Optical beams generated by laser emitters 302 that are not immediately adjacent would not overlap. The refresh rate can be maximized without impacting eye safety by using a rule that adjacent lasers cannot be fired simultaneously, but non-adjacent lasers of different wavelength can be fired simultaneously.

In this firing rule, lasers 302 on bars 304 labeled B1 in FIG. 3 could not be operated when lasers 302 on bars 304 labeled A1 and A2 in FIG. 3 are operated. In addition, lasers 302 on bars 304 labeled A2 could not be operated when lasers 302 on bars 304 labeled B1 and B2 are operated. Also, lasers 302 on bars 304 labeled A1 may be operated simultaneously lasers 302 on bars 304 labeled B2. In this way, a system of firing rules that allows simultaneous operation of non-adjacent bars at the maximum pulse rate of the system, but ensure that the resulting energy in the optical beams in the eye safety measurement aperture is below the Maximum Permissible Exposure (MPE) limit. This ensures Class 1 eye safety of the overall LIDAR system.

In some embodiments of the scanning LIDAR system of the present teaching, the rules for firing patterns for lasers are generated based on monitoring the illumination pattern that is emitted from the illuminator. That is, a monitor would determine the peak energy in a particular aperture at a particular distance, and a firing pattern would be determined that ensured the peak energy in a particular aperture at a particular distance was less than a particular value. In some embodiments, a rule for the firing pattern of the lasers would be no lasers that produce two or more optical beams that overlap in any eye-safety measurement aperture associate with the illuminator are operated simultaneously. This rule would apply to a system in which each laser generated an optical beam that produced the maximum energy allowed within the eye-safety measurement aperture.

Another aspect of the present teaching is that various operating specifications, such as laser power operating variations and the mechanical tolerances for positioning the optical beams in the illuminator can be achieved by appropriate choice of the rules for firing (energizing or activating) patterns for the lasers.

Figure 4A:
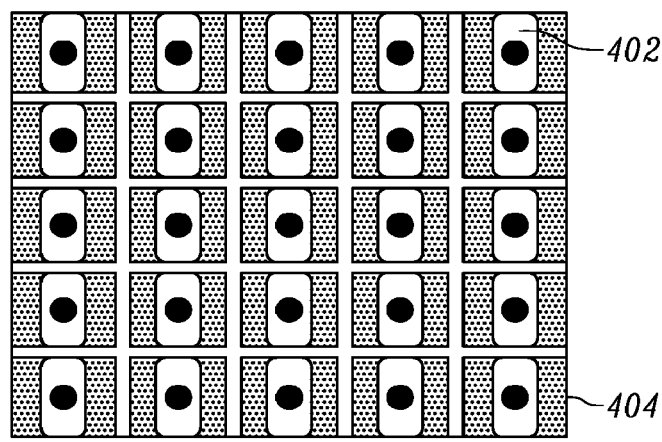
FIG. 4A illustrates a chip comprising multiple cluster VCSEL devices arranged individually.

Various embodiments of the LIDAR systems of the present teaching utilize multiple cluster VCSEL devices on a single chip. FIG. 4A illustrates an array 400 comprising multiple cluster VCSEL devices 402. In particular, FIG. 4A illustrates a twenty-five cluster VCSEL devices 402 in a two-dimensional array. The array is formed with contacts 404 for twenty-five individual cluster VCSEL devices 402 that can be individually biased.

Figure 4B:
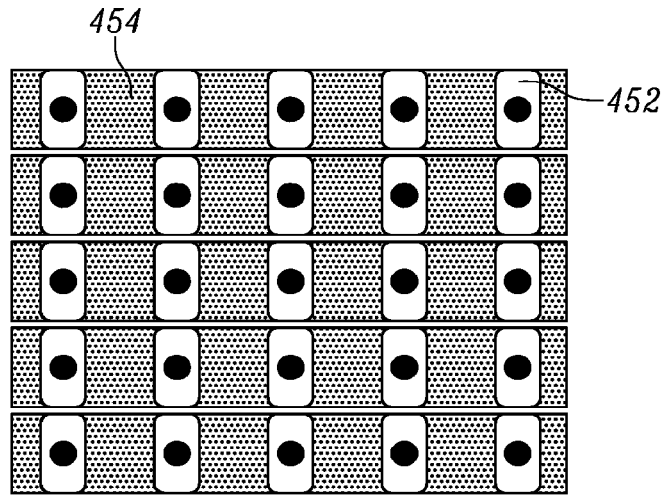
FIG. 4B illustrates a chip comprising multiple cluster VCSEL devices arranged in bars.

FIG. 4B illustrates an array 450 comprising multiple cluster VCSEL devices 452. FIG. 4B illustrates that the array is arrange to include five cluster VCSEL devices 452 connected with contacts 454 that form five bars with each bar including five cluster VCSEL devices 452. It will be evident to those familiar with the art that a single monolithic 2D VCSEL array can be produced as well.

Figure 4C:
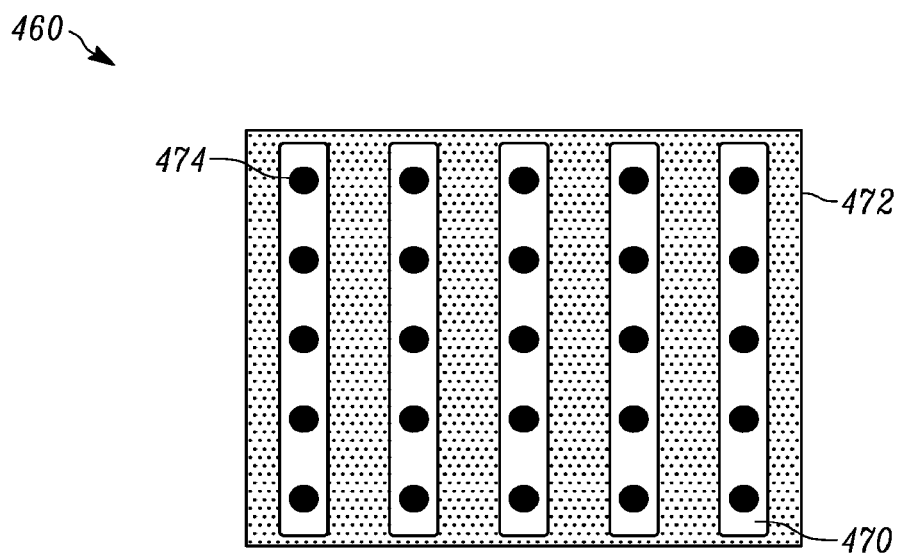
FIG. 4C illustrates a top-view of an anode metal contact pad of a chip comprising multiple cluster VCSEL devices of the present teaching.

FIG. 4C illustrates a top-view of an anode metal contact pad 470 of a chip 472 comprising multiple cluster VCSEL devices 474 in a 2D monolithic VCSEL array. The chip illustrated in FIG. 4C is a top-side illuminating VCSEL array. All the anodes of all VCSEL in a single column are connected together with a single metal contact.

Figure 4D:
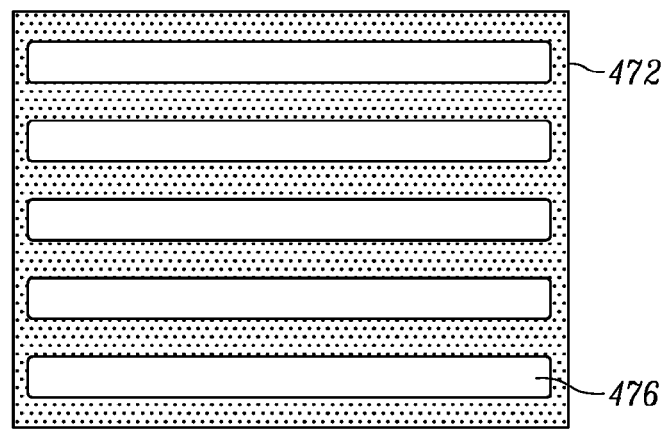
FIG. 4D illustrates a bottom-view of a cathode metal contact pad of the chip comprising the multiple cluster VCSEL devices illustrated in FIG. 4C.

FIG. 4D illustrates a bottom-view of a cathode metal contact pad 476 of the chip 472 comprising the multiple cluster VCSEL devices illustrated in FIG. 4C. All the cathodes in a single row are connected together with a single metal contact in a manner that reduces the number of electrical connections. With this pattern of metallization, individual VCSEL devices 474 (FIG. 4C) can be operated by biasing each row and column contact at the desired bias level. In general, when the anodes of one group of laser emitters are connected to one contact, and the cathodes of a second group of laser emitters are connected to a second contact, only those individual lasers belonging to both the first and second group of laser emitters, i.e. those that have an anode and a cathode connected, will be energized when the first and second contacts are appropriately biased.

For the particular confirmation shown in FIG. 4D with 5 rows and 5 columns, only 10 electrical connections are required versus 25 electrical connections if the VCSEL devices 474 were individually connected. One skilled in the art will appreciate that the configuration shown in FIG. 12D, is one of numerous possible electrical addressing configurations and that the present teaching is not limited to any particular row and column configuration or geometries for the emitters. It's important to note that this advantage in reducing the number of electrical connections is greater as the size of the 2D VCSEL array increases.

The use of one contact connected to anodes of one group of laser emitters and a second contact connected to cathodes of a second group of laser emitters can be used to energize one laser emitter, or groups of laser emitters, for a particular bias condition, depending on the configuration of the connections. The anodes connections of various lasers to various contacts and the cathodes connections of various lasers connected to various contacts determine the rules for firing patterns. For example, the known pattern of individual laser emitters, or groups of laser emitters, that are energized together, and the energy the optical beams these lasers generate at a particular eye-safety measurement aperture, are all accounted in a fire control scheme when determining which individual lasers or groups are allowed to fire simultaneously.

Figure 5:
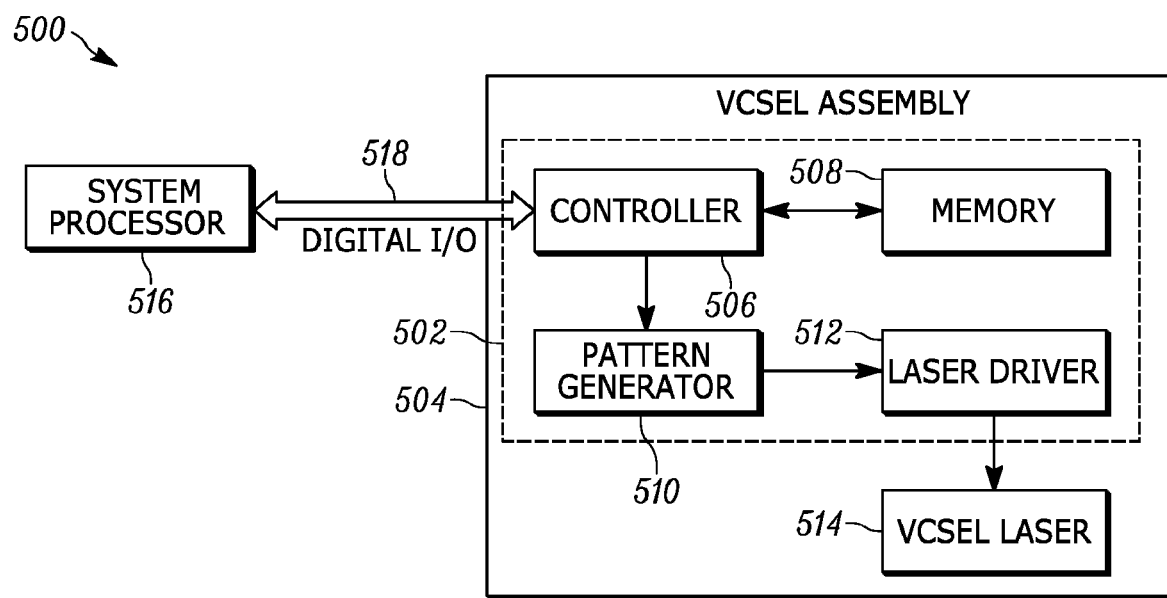
FIG. 5 illustrates a system block diagram of an embodiment of a compact VCSEL laser driver assembly for an eye-safe LIDAR system according to the present teaching.

FIG. 5 illustrates a system block diagram of an embodiment of a compact VCSEL laser driver assembly 500 for a multi-wavelength LIDAR of the present teaching. In this embodiment, the pulse generation chain 502 is generated locally on the same carrier of the VCSEL assembly 504. The pulse generation chain 502 comprises a pulse controller 506, memory 508, pulse pattern generator 510, and a laser driver 512. The laser driver 512 is connected to a VCSEL laser 514, as shown. In some embodiments, the laser driver is connected to a common contact used to drive multiple VCSEL lasers. In some embodiments, pulse shapes might be stored in a local memory or generated by a combination of the controller and pattern generator.

The system processor 516 is connected via a digital input/output connection 518. The system processor 516 generates a set of instructions that instructs the laser to fire and for how long. These instructions will determine the firing pattern type. But, the firing pattern generation and biasing of the lasers is done locally on the VCSEL assembly. Generating the laser driver pulse patterns locally on the VCSEL assembly greatly simplifies the required interface to the overall LIDAR system. In some embodiments, the pulse controller 506, memory 508, pulse pattern generator 510 and laser driver 512 functions are all contained within a single IC package. In various embodiments, the VCSEL devices can be hermetically packaged or non-hermetically packaged.

The rules for firing the lasers can be stored in various places in the scanning LIDAR system. In some embodiments, the rules for firing the lasers are stored in memory 508. In some embodiments, the rules for firing the lasers are input via the digital I/O 518. In yet other embodiments, the rules for firing the lasers are generated in the system processor based on operating parameters of the LIDAR system. In yet other embodiments, the rules for firing the lasers are generated in the controller based on operating parameters of the LIDAR system. In yet other embodiments, the rules for firing the lasers change over time based on changes in output power, pulse widths, and repetition rates provided by the laser driver assembly 500.

One feature of the present teaching is that a combination of the spacing of the transmitter elements and/or the transmitter arrays, the firing pattern of the transmitter elements, and the optics used for projection and/or collimation determine if and where in space laser beams will overlap. In addition, separate arrays with separate wavelengths may be used. FIG. 6A illustrates a schematic diagram of an embodiment of LIDAR illuminator 600 of the present teaching using two arrays of VCSEL of different wavelengths with a first lens system. The two VCSEL arrays 602, 604 are offset by a distance 606 of ~8 mm. It can be seen that in some cases, the individual laser beams 608, 610 from each array of VCSEL will combine in space, while in other cases the lasers beams 612, 614 will not combine. A geometrical relationship exists that determines the criterion under which the beams 608, 610, 612, 614 will combine or not. For example, with an 8 mm offset distance 606 between arrays 602, 604, beams that are projected at the same nominal angle (i.e. beams 608, 614 and beams 612, 610 from the two separate arrays) will not combine spatially to exceed the eye safety limit at a 7 mm aperture 616 that is positioned at a distance 618 of 100 mm. If we were to take only the 7 mm aperture 616 into account, a simple rule that would allow simultaneous firing of VCSEL from both arrays 602, 604 would be to choose the same position within each array under the assumption that the lens systems for each array are nominally identical.

However, if the beams are highly collimated, then we need to consider the other eye safety criteria corresponding to use of binoculars. FIG. 6B illustrates a schematic diagram of an embodiment of LIDAR illuminator 630 of the present teaching using two arrays 632, 634 of VCSEL of different wavelengths with a second lens system that produces highly collimated beams. Two beams with the same projection angle when highly collimated will combine in a 50 mm aperture at 2,000 mm. In order for the beams to not combine in a 50 mm aperture at 2,000 mm, the beams must differ by ~1.4° relative to each other. Thus, in the embodiment shown in FIG. 6B, the laser beams 636, 638 from the two arrays 632, 634 are projecting at an angle 640 of 1.4° relative to each other so that the laser eye safety rule will be met for the condition of use of binoculars. The laser beams 636, 638 do not overlap in a 50 mm aperture 642 at a distance 644 of 2000 mm. In some embodiments, the lens system of FIG. 6B is the same as the lens system in the embodiment described in connection with FIG. 6A, and the projection angles that determine whether or not the beams combine is based on the firing pattern of the laser elements in the VCSEL arrays. In some embodiments, the projection angles are also affected by the configuration of the lens system. Regardless of the mechanism by which the projection angles are determined, the condition for non-overlapping beams that meet a laser eye safety rule is a projection at an angle 640 of 1.4° relative to each other.

Figure 6C:
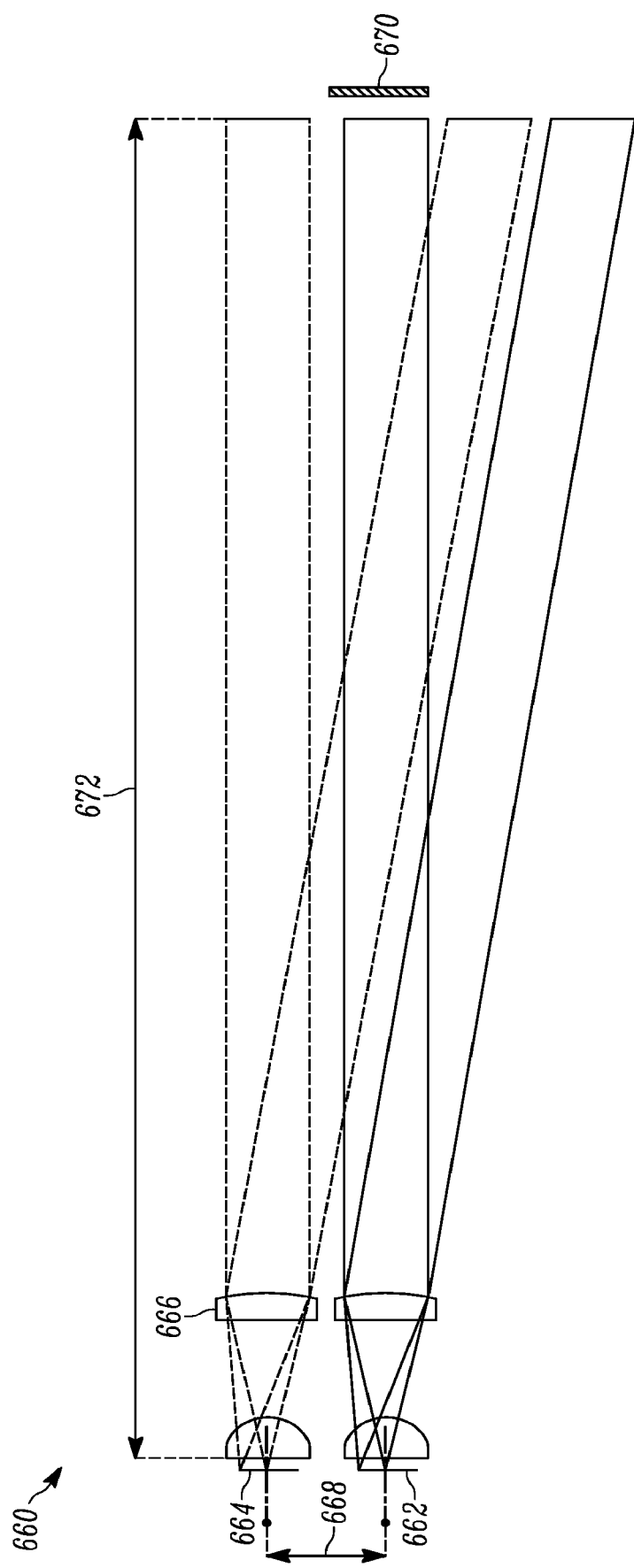
FIG. 6C illustrates a schematic diagram of an embodiment of LIDAR illuminator of the present teaching using two arrays of VCSEL of different wavelengths with a third lens system.

FIG. 6C illustrates a schematic diagram of an embodiment of LIDAR illuminator 660 of the present teaching using two arrays 662, 664 of VCSEL of different wavelengths with a third lens system 666. The two arrays 662, 664 are separated by a distance 668 of ~8 mm. The range of angles excluded from the 7 mm aperture 670 at 100 mm distance 672 is shown in FIG. 6C. Here we can see that a range from 0° to −9.5° needs to be avoided for the upper array laser beam relative to the lower array laser beam. Thus, when combining the two safety conditions in some embodiments, the system utilizes a relative projection angle between an upper beam and a lower beam that is outside the range from 1.4° to −9.5° in order to perform simultaneous firing of the lasers.

EQUIVALENTS

While the Applicant's teaching are described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A LIDAR illuminator comprising:
   a) a laser array comprising a plurality of laser sources that each generate an optical beam when energized at an electrical input, the plurality of laser sources being arranged such that the generated optical beams from at least some of the plurality of laser sources overlap spatially at a target in an eye-safety measurement aperture and at least some other of the generated optical beams do not overlap spatially at the target; and
   b) a controller having an output that is electrically connected to an input of a laser driver, the laser driver comprising a plurality of electrical outputs, one of the plurality of electrical outputs being electrically connected to one of the plurality of laser sources, the controller being configured to energize the plurality of laser sources based on a firing pattern rule such that the generated optical beams from at least some of the plurality of laser sources that overlap spatially at the target are not energized at a same time and being configured to energize the plurality of laser sources so that an optical power generated by the laser array does not exceed a Maximum Permissible Exposure (MPE) limit in the eye-safety measurement aperture at the target.

2. The LIDAR illuminator of claim 1 wherein a respective one of the plurality of electrical outputs of the laser driver is connected to an electrical input of a respective one of the plurality of laser sources.

3. The LIDAR illuminator of claim 1 wherein one of the plurality of electrical outputs of the laser driver is electrically connected to inputs of at least two of plurality of laser sources.

4. The LIDAR illuminator of claim 1 wherein one of the plurality of electrical outputs of the laser driver is electrically connected to a common contact used to drive multiple VCSEL lasers.

5. The LIDAR illuminator of claim 1 wherein the controller is further configured to energize the plurality of laser sources based on a firing pattern rule such that at least some of the other of the generated optical beams that do not overlap spatially at the target are energized at a same time.

6. The LIDAR illuminator of claim 1 wherein the firing pattern rule is a mathematical rule.

7. The LIDAR illuminator of claim 1 wherein the firing pattern rule is a set of mathematical rules.

8. The LIDAR illuminator of claim 1 wherein the firing pattern rule is chosen so as to result in an allowed sequence of firing that meets an eye safety limit.

9. The LIDAR illuminator of claim 1 wherein the firing pattern rule is chosen so as to result in an allowed sequence of firing that meets a performance metric.

10. The LIDAR illuminator of claim 1 wherein the firing pattern rule comprises a pseudo-random sequence.

11. The LIDAR illuminator of claim 1 wherein the laser array comprises a vertical cavity surface emitting laser (VCSEL) array.

12. The LIDAR illuminator of claim 1 wherein at least one VCSEL in the VCSEL array comprises a cluster VCSEL.

13. The LIDAR illuminator of claim 1 wherein the eye-safety measurement aperture is about 7 mm at the target.

14. The LIDAR illuminator of claim 1 wherein the plurality of laser sources in the laser array are positioned in a plurality of rows.

15. The LIDAR illuminator of claim 14 wherein at least some of the generated optical beams from at least some of the plurality of laser sources in adjacent rows of the plurality of rows overlap spatially at the target and at least some other of the generated optical beams from the plurality of laser sources in non-adjacent rows of the plurality of rows do not overlap spatially at the target.

16. The LIDAR illuminator of claim 15 wherein the firing pattern rule comprises a firing rule that allows simultaneous energizing of laser sources in non-adjacent rows.

17. The LIDAR illuminator of claim 15 wherein the firing pattern rule comprises a firing rule that prohibits simultaneous energizing of laser sources in adjacent rows.

18. The LIDAR illuminator of claim 1 wherein the laser array further comprises at least one single metal contact that connects the electrical inputs of at least two of the plurality of laser sources in the laser array.

19. The LIDAR illuminator of claim 1 wherein the laser array further comprises at least one single metal contact that connects the electrical inputs of a plurality of laser sources in the laser array that are position in a row.

20. The LIDAR illuminator of claim 1 wherein the laser array further comprises at least one single metal contact that connects the electrical inputs of a plurality of laser sources in the laser array that are position in a column.

21. A LIDAR illuminator comprising:
   a) a laser array comprising a plurality of laser sources that each generate an optical beam when energized at an electrical input, the plurality of laser sources being arranged such that the generated optical beams from at least some of the plurality of laser sources overlap spatially at a target in an eye-safety measurement aperture and at least some other of the generated optical beams do not overlap spatially at the target; and
   b) a processor comprising a digital output;
   c) a controller having a digital input that is electrically connected to the digital output of the processor, and an output,
   d) a laser driver having an input that is electrically connected to the output of the controller and a plurality of electrical outputs, each ene of the plurality of electrical outputs being electrically connected to one of the plurality of laser sources, the controller being configured to energize the plurality of laser sources based on a firing pattern rule such that the generated optical beams from at least some of the plurality of laser sources that overlap spatially at the target are not energized at a same time and being configured to energize the plurality of laser sources so that an optical power generated by the laser array does not exceed a Maximum Permissible Exposure (MPE) limit in the eye-safety measurement aperture at the target.

22. The LIDAR illuminator of claim 21 wherein the processor includes the controller.

23. The LIDAR illuminator of claim 21 further comprising a pattern generator.

24. The LIDAR illuminator of claim 23 wherein the pattern generator and the laser driver are formed within a single integrated circuit.

25. The LIDAR illuminator of claim 21 further comprising a memory that is electrically connected to the controller, the memory storing pulse shapes.

26. The LIDAR illuminator of claim 25 wherein the memory and the laser driver are formed within a single integrated circuit.

27. The LIDAR illuminator of claim 21 wherein a respective one of the plurality of electrical outputs of the laser driver is connected to an electrical input of a respective one of the plurality of laser sources.

28. The LIDAR illuminator of claim 21 wherein one of the plurality of electrical outputs of the laser driver is electrically connected to inputs of at least two of plurality of laser sources.

29. The LIDAR illuminator of claim 21 wherein the controller is further configured to energize the plurality of laser sources based on a firing pattern rule such that at least some of the other of the generated optical beams that do not overlap spatially at the target are energized at a same time.

30. The LIDAR illuminator of claim 21 wherein the firing pattern rule is a mathematical rule.

31. The LIDAR illuminator of claim 21 wherein the firing pattern rule is chosen so as to result in an allowed sequence of firing that meets an eye safety limit.

32. The LIDAR illuminator of claim 21 wherein the plurality of laser sources in the laser array are positioned in a plurality of rows and at least some of the generated optical beams from at least some of the plurality of laser sources in adjacent rows of the plurality of rows overlap spatially at the target and at least some other of the generated optical beams from the plurality of laser sources in non-adjacent rows of the plurality of rows do not overlap spatially at the target.

33. The LIDAR illuminator of claim 32 wherein the firing pattern rule comprises a firing rule that allows simultaneous energizing of laser sources in non-adjacent rows.

34. The LIDAR illuminator of claim 32 wherein the firing pattern rule comprises a firing rule that prohibits simultaneous energizing of laser sources in adjacent rows.

35. A LIDAR illuminator comprising:
   a) a laser array comprising a plurality of laser sources positioned in a plurality of rows such that each of the plurality of laser sources generate an optical beam when energized at an electrical input, the plurality of laser sources being arranged such that the generated optical beams from at least some of the plurality of laser sources overlap spatially at a target and at least some other of the generated optical beams do not overlap spatially at the target; and b) a controller having an output that is electrically connected to an input of a laser driver, the laser driver comprising a plurality of electrical outputs, one of the plurality of electrical outputs being electrically connected to one of the plurality of laser sources, the controller being configured to energize the plurality of laser sources based on a firing pattern rule such that at least some of the generated optical beams from at least some of the plurality of laser sources in adjacent rows of the plurality of rows overlap spatially at the target and at least some other of the generated optical beams from the plurality of laser sources in non-adjacent rows of the plurality of rows do not overlap spatially at the target.

36. The LIDAR illuminator of claim 35 wherein the controller is further configured such that the generated optical beams from at least some of the plurality of laser sources that overlap spatially at the target are not energized at a same time.

37. The LIDAR illuminator of claim 35 wherein the firing pattern rule comprises a firing rule that allows simultaneous energizing of laser sources in non-adjacent rows.

38. The LIDAR illuminator of claim 35 wherein the firing pattern rule comprises a firing rule that prohibits simultaneous energizing of laser sources in adjacent rows.

39. A LIDAR illuminator comprising:

a) a laser array comprising a plurality of laser sources positioned in a plurality of rows such that each of the plurality of laser sources generate an optical beam when energized at an electrical input, the plurality of laser sources being arranged such that at least some of the generated optical beams from at least some of the plurality of laser sources in adjacent rows of the plurality of rows overlap spatially at the target and at least some other of the generated optical beams from the plurality of laser sources in non-adjacent rows of the plurality of rows do not overlap spatially at the target;

b) a processor comprising a digital output;

c) a controller having a digital input that is electrically connected to the digital output of the processor and having an output; and d) a laser driver having an input that is electrically connected to the output of the controller and a plurality of electrical outputs, each of the plurality of electrical outputs being electrically connected to one of the plurality of laser sources, the controller being configured to energize the plurality of laser sources based on a firing pattern rule such that the generated optical beams from at least some of the plurality of laser sources that overlap spatially at the target are not energized at a same time.

40. The LIDAR illuminator of claim 39 wherein the firing pattern rule comprises a firing rule that allows simultaneous energizing of laser sources in non-adjacent rows.

41. The LIDAR illuminator of claim 39 wherein the firing pattern rule comprises a firing rule that prohibits simultaneous energizing of laser sources in adjacent rows.

* * * * *